United States Patent
Murotani et al.

(10) Patent No.: US 7,380,064 B2
(45) Date of Patent: May 27, 2008

(54) STORAGE DEVICE AND STORAGE DEVICE DATA LIFE CYCLE CONTROL METHOD

(75) Inventors: Akira Murotani, Odawara (JP); Kenji Ishii, Ninomiya (JP)

(73) Assignee: Hitachi, Ltd., Tokyo (JP)

( * ) Notice: Subject to any disclaimer, the term of this patent is extended or adjusted under 35 U.S.C. 154(b) by 356 days.

(21) Appl. No.: 11/034,820

(22) Filed: Jan. 14, 2005

(65) Prior Publication Data
US 2006/0107016 A1  May 18, 2006

(30) Foreign Application Priority Data
Nov. 12, 2004 (JP) ............................. 2004-328806

(51) Int. Cl.
*G06F 13/00* (2006.01)
(52) U.S. Cl. .................. 711/133; 711/159; 711/113; 711/118; 711/162; 711/112
(58) Field of Classification Search .............. 711/133, 711/159, 112, 113, 135, 203, 162, 165, 117, 711/118, 173, 119
See application file for complete search history.

(56) References Cited

U.S. PATENT DOCUMENTS

| | | | |
|---|---|---|---|
| 5,155,835 A | | 10/1992 | Belsan |
| 6,131,147 A | * | 10/2000 | Takagi ...................... 711/159 |
| 6,775,790 B2 | | 8/2004 | Reuter et al. |
| 6,961,838 B2 | * | 11/2005 | Reuter et al. ............... 711/203 |
| 2005/0120180 A1 | * | 6/2005 | Schornbach et al. ........ 711/133 |
| 2005/0172078 A1 | * | 8/2005 | Wu et al. .................... 711/133 |
| 2005/0193245 A1 | * | 9/2005 | Hayden et al. .............. 714/13 |
| 2005/0210210 A1 | * | 9/2005 | Arai et al. ................... 711/162 |
| 2005/0273570 A1 | * | 12/2005 | DeSouter et al. ........... 711/203 |

FOREIGN PATENT DOCUMENTS

| | | |
|---|---|---|
| EP | 1 178 407 | 2/2002 |
| JP | 2002-91706 | 3/2002 |
| WO | WO 02/25445 | 3/2002 |

* cited by examiner

*Primary Examiner*—Hong Kim
(74) *Attorney, Agent, or Firm*—Antonelli, Terry, Stout & Kraus, LLP.

(57) ABSTRACT

The present invention improves the performance of a storage device by utilizing the special features of different types of volumes. The control part of the storage device constructs a virtual volume in the memory. The virtual volume is constructed by a low-speed volume and a high-speed volume, and has the same size capacity as the low-speed volume. When the application program of the host requests the updating of data, the write data is respectively written into low-speed and high-speed volumes, and a life tag that indicates the storage period is set beforehand in the virtual volume. When the storage period has elapsed, the data is erased from the high-speed volume. The data in the low-speed volume is maintained "as is". While the data is held in the high-speed volume, access from the host is processed utilizing the data in the high-speed volume.

17 Claims, 22 Drawing Sheets

FIG. 5

MAPPING TABLE T1

| LUN# | LDEV | | VDEV | | | |
|---|---|---|---|---|---|---|
| | # | MAX SLOT NUMBER | # | MAX SLOT NUMBER | DEVICE TYPE | PATH INFORMATION |
| 0 | 0 | 50000 | 0 | 50000 | SATA_Disk | WWN, LUN |
| 1 | 1 | 50000 | 1 | 50000 | SATA_Disk | WWN, LUN |
| 2 | 2 | 50000 | 2 | 50000 | FC_Disk | INTERNAL PATH INFORMATION |

FIG. 21A

| LUN-FC VOLUME CORRESPONDENCE TABLE | | ~T7 |
|---|---|---|
| LUN | FC VOLUME NUMBER | |
| #0 | #0 | |
| #1 | #1 | |

FIG. 21B

| LUN-FC VOLUME CORRESPONDENCE TABLE | | ~T7 |
|---|---|---|
| LUN | FC VOLUME NUMBER | |
| #0 | #0 | |
| #1 | #0 | |
| #2 | #1 | |
| #3 | #1 | |
| ... | ... | |

STORAGE DEVICE AND STORAGE DEVICE DATA LIFE CYCLE CONTROL METHOD

CROSS-REFERENCE TO RELATED APPLICATIONS

This application relates to and claims priority from Japanese Patent Application No. 2004-328806 filed on Nov. 12, 2004, the entire disclosure of which is incorporated herein by reference.

BACKGROUND OF THE INVENTION

1. Field of the Invention

The present invention relates to a storage device and a storage device data life cycle control method.

2. Description of the Related Art

In storage devices, for example, storage regions based on an RAID (redundant array of independent disks) are constructed using storage devices such as hard disk drives, semiconductor memory drives or the like. For example, such physical storage regions (logical volumes) are provided to host computers (hereafter referred to as "hosts") such as server machines or the like. Application programs operating in the hosts provide information processing services to client terminals connected to the hosts by writing data into the logical volumes or reading out data from the logical volumes.

The quantities of data that must be stored by storage systems are continually increasing; furthermore, depending on the type of data, there are also cases in which long-term storage is required. Accordingly, in order to meet this increasing demand, replacement with large-capacity disk drives, or the introduction of new type high-performance storage devices, has been seen.

Furthermore, a technique which is devised so that virtual volumes can be constructed by virtualizing logical volumes respectively possessed by respective storage devices, and these virtual volumes can be provided to respective hosts, is also known (Japanese Patent Application Laid-Open No. 2002-91706).

In conventional storage systems, new types of disk drives and new types of storage devices are introduced as necessary in order to increase the storage capacity and improve the response characteristics. However, the utilization value (utilization frequency) of data is not fixed, but drops as time passes according to the type of application program and the like. For example, in the case of a data base, data groups that constitute a monthly tabulation for a certain month are frequently utilized only during the period for which the monthly tabulation is created; after this monthly tabulation is completed, these data groups are hardly used at all until the deadline for the creation of a yearly tabulation arrives, and are merely stored "as is". Furthermore, for example, in the case of email serving program, reference is made to email data only within a relatively short period following the receipt of this email; after a reply to the email is completed, the data is stored for a long period of time without being used.

Accordingly, even in cases where a high-speed volume constructed by a disk drive with good response characteristics is introduced, this high-speed volume becomes filled with data groups whose utilization rate has dropped as operation is continued. Meanwhile, in cases where data stored in a low-speed volume is referred to or updated, time is required for the reading and writing of such data, so that the response characteristics drop.

In cases where all of the volumes are constructed by high-speed volumes, the cost is increased; accordingly, it is necessary to operate using a mixture of high-speed volumes and low-speed volumes. However, as was described above, since high-speed volumes also eventually become filled with unnecessary non-urgent data, the high-speed characteristics cannot be utilized over a long period of time.

Meanwhile, a technique called data migration is also known. In the case of this data migration, for example, unnecessary non-urgent data is moved from the main volume to another volume, so that the empty capacity of the main volume is maintained. In this case, for example, since the question of which data corresponds to which file, the question of which files have a low frequency of use and the like cannot be grasped on the side of the storage device, data migration is performed on the basis of instructions from the side of the host.

Accordingly, it is necessary to grasp the frequency of use of the respective files on the side of the host, and to move these files from the current volume to another volume, so that the operating burden on the host side is increased, and the convenience of the system is poor. For example, the user must specify the file that is the object of movement, and must give instructions for the movement of this data. Furthermore, for example, the host must read out the file that is the object of movement from the current volume, and write this read-out file into another volume, so that the burden of data input-output on the network is increased.

SUMMARY OF THE INVENTION

Accordingly, one object of the present invention is to provide a storage device and a storage device data life cycle control method which are devised so that the data storage positions can be controlled in accordingly with the frequency of utilization in an environment different types of volumes are mixed. Another object of the present invention is to provide a storage device and storage device data life cycle control method which are devised so that data can be disposed while utilizing the response characteristics of a high-speed volume. Another object of the present invention is to provide a storage device and storage device data life cycle control method which make it possible to use storage resources in an efficient manner while maintaining the high-speed response characteristics of high-speed volumes in an environment in which high-speed volumes and low-speed volumes are mixed. Still other objects of the present invention will become clear from the following description of embodiments.

The storage device of the present invention that is used to solve the abovementioned problems comprises a first volume which stores data utilized by a host device, a second volume which stores a portion of the data contained in the data stored in the first volume, a first control part which is used to control the data stored in the second volume, a second control part which controls the correspondence relationship between the data stored in the second volume and the data stored in the first volume, a third control part which performs control by associating a storage period with the updated data when data updating is performed for the second volume, a data erasing part which detects data for which the storage period has elapsed among the data stored in the second volume, and erases this data from the second volume, and an access processing part which processes access requests from the host device by using the first control part and/or the second control part.

All of the data utilized by the host device can be stored in the first volume, and a portion of the data stored in the first volume can be stored in the second volume. However, at certain points in time, there may also be cases in which there is data that is stored only in the second volume, and that is not stored in the first volume. The data that is stored in the second volume is also stored in the first volume at a specified timing. Accordingly, the data that is stored in the first volume, or a portion of the data that is stored in the first volume, is stored in the second volume.

The first volume may also be constructed as a relatively low-speed volume, and the second volume may also be constructed as a relatively high-speed volume. In other words, all of the data that is utilized by the host device is stored in the low-speed first volume, and a portion of this data is also stored in the high-speed second volume.

In cases where the data that is the object of an access request from the host device is stored in both the first volume and second volume, the access processing part can process this access request using the second volume. As a result, in cases where the second volume is a high-speed volume, the response to the host device can be improved.

A virtual volume which is virtualized including the first volume and second volume is provide to the host device, and this virtual volume has the same storage capacity as the first volume; accordingly, the host device can send access requests to the virtual volume.

The virtual volume is a volume that is virtualized including the first volume and second volume, and has the same size storage space as the first volume. Specifically, the virtual volume is constructed with the data stored in the first volume and the data stored in the second volume melded together, and the host device can read and write data from and into this virtual volume. The data that is written into the virtual volume by the host device is stored in the first volume, and is also stored in the second volume for the storage period that is set for this data.

In cases where data is written into the virtual volume by the host device, the access processing part can write the data into the first volume in the same storage position as the storage position in the virtual volume, and can write the data into the second volume in a different storage position from the storage position in the virtual volume.

Specifically, the first volume and the virtual volume have the same storage space, and data that is written with the virtual volume as the object is stored in the first volume in the same storage position as the storage position in the virtual volume. On the other hand, the storage space need not coincide between the virtual volume and the second volume, and the respective data storage positions may differ between the virtual volume and the second volume. As a result, relatively new data only can be held in the second volume by using the second volume which has a smaller storage capacity than the virtual volume.

When data is updated for the second volume, the third control part can perform control so that a storage period is associated with this updated data. Here, for example, the storage period can be set in stages, such as 12 hours, 1 day, 3 days, 1 week, 1 month, 6 months, 1 year or the like.

The storage period can be set beforehand in LU (logical unit) units. Specifically, for example, the storage period can be set in advance for each virtual volume, or for each logical volume constructing the respective virtual volumes, and storage periods can be set uniformly for the data written into the volumes. Thus, the respective data storage periods can all be controlled on the side of the storage device without operating by the host device.

On the other hand, the storage period can also be set for specified units by the host device. In this case, the third control part controls the storage period designated by the host device. Furthermore, the host device can set the storage position in file units or directory units, or in both types of units. For example, the host device sets the storage period for specified units by issuing a write command including the storage period, and the third control part performs control by associating the storage period contained in this write command with the data that is written by this write command. Thus, the work can also be divided between the host device and the storage device by performing the setting of the storage period on the side of the host device and performing the movement of the data in accordance with the storage period on the side of the storage device.

The data erasing part can confirm that data that is the object of erasing is stored in the first volume, and in cases where data that is the object of erasing is not stored in the first volume, the data erasing part can delete this data that is the object of erasing from the second volume after storing this data that is the object of erasing in the first volume. Specifically, in order to ensure that data that is stored only in the second volume is not erroneously erased from the second volume, the data erasing part confirms that the data that is the object of erasing is stored in the first volume, and in cases where this data is not stored in the first volume, the data erasing part erases the data that is the object of erasing from the second volume after copying this data into the first volume.

In cases where a cache memory that temporarily stores the data that is written in from the host device is further provided, the access processing part stores data from the host device in the second volume if a specified empty capacity is not present in the cache memory.

The first volume or second volume, or both of these volumes, can be associated with the external volume of another storage device disposed on the outside, and write data aimed at the first volume or second volume can be stored in this external volume. Specifically, the external volume of another external storage device can be used as though this were an internal volume governed by the system itself. In cases where both the first volume and second volume are constructed by external volumes, it is sufficient of the storage device has only a function that controls access to the volumes and the like. Accordingly, in this case, the storage device need not be constructed as a storage device; for example, this storage device may also be constructed as a highly functionalized switch.

A plurality of first volumes can be provided, and a single second volume can be respectively associated with this plurality of first volumes. In other words, for example, only relatively new data (among the data respectively written into the plurality of first volumes) can be held by a single second volume. Furthermore, a construction in which second volumes are independently associated with each first volume can also be used.

For example, there are cases in which all or some of the functions, means and steps of the present invention are constructed as computer programs that are executed by a microcomputer. Furthermore, for example, such computer programs can be fixed and distributed in storage media such as hard disks, optical disks, semiconductor memories or the like. Moreover, such computer programs can be distributed via communications networks such as the internet or the like.

BRIEF DESCRIPTION OF THE DRAWINGS

FIG. 5 is an explanatory diagram showing the construction of the mapping table;

FIG. 21 is an explanatory diagram showing the LUN-FC correspondence table, with FIG. 21(a) showing a case in which respective FC volumes respectively correspond to respective LUNs, and FIG. 21(b) showing a case in which a plurality of FCs are respectively associated with a plurality of LUNs.

DESCRIPTION OF THE PREFERRED EMBODIMENTS

Figure 1:
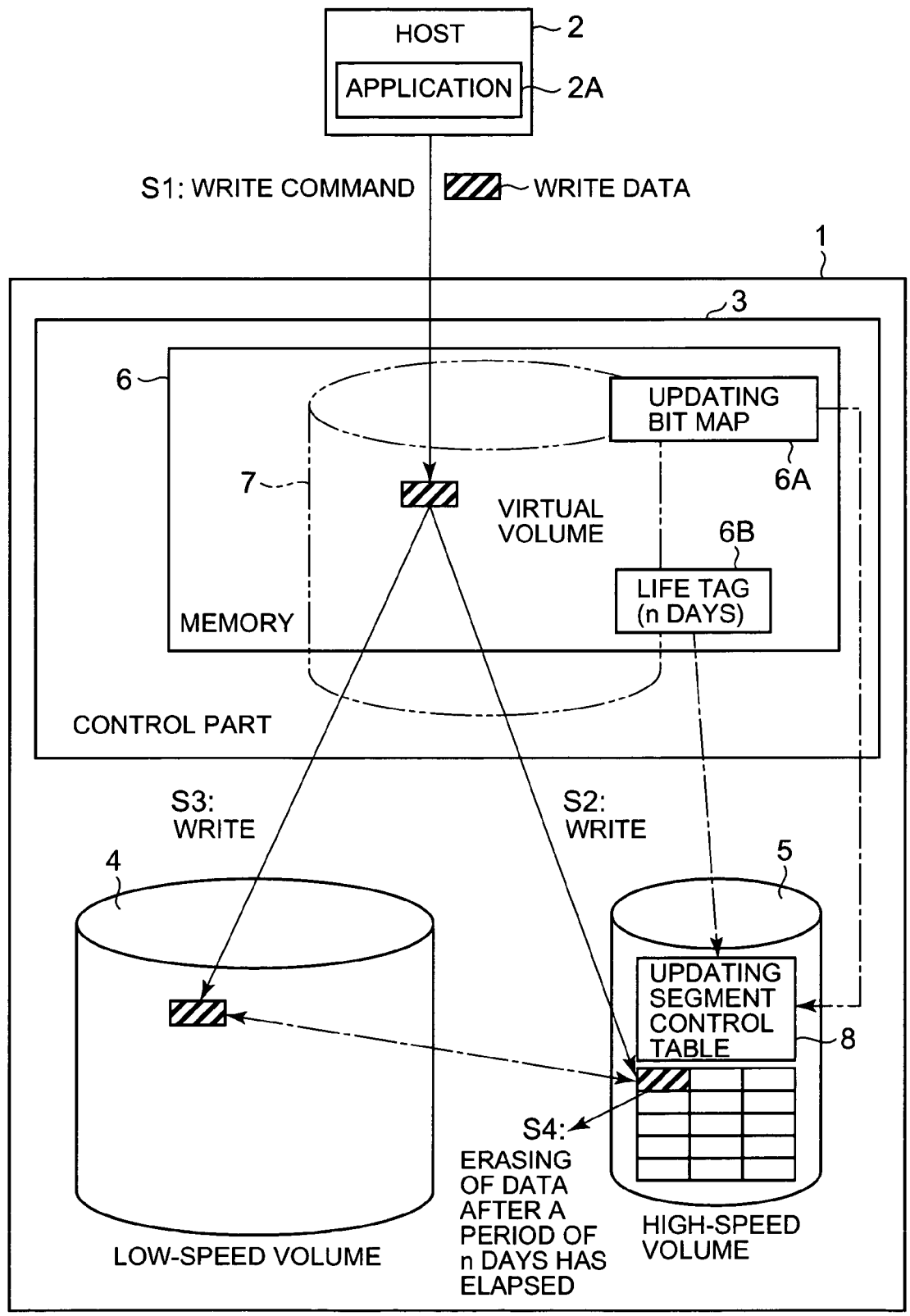
FIG. 1 is an explanatory diagram which shows a schematic outline of an embodiment of the present invention.

Embodiments of the present invention will be described below with reference to the attached figures. FIG. 1 is an overall schematic diagram of the present embodiment. Details will be described later; however, as is shown in FIG. 1, the storage device 1 of the present embodiment is connected to a host 2 via a communications network such as (for example) an FC_SAN (fiber channel_storage area network) or the like. The application program (hereafter abbreviate to "application") 2A of the host 2 provides a specified information processing service to client terminals (not shown in the figures) by writing data into or reading data from the storage device 1.

The storage device 1 comprises a control part 3, a low-speed volume 4 corresponding to the first volume, and a high-speed volume 5 corresponding to the second volume, and the control part 3 comprises a memory 6.

For example, the low-speed volume 4 can be constructed by an SATA (serial AT attachment) disk, an SCSI (small computer system interface) disk or the like. For example, the high-speed volume 5 can be constructed by an FC disk (fiber channel disk). Generally, performance and cost drop in the order of FC disk, SCSI disk, SATA disk. Furthermore, an SAS (serial attached SCSI) disk can also be used. Furthermore, disks that can be used are not limited to these disks; equivalents of FC disks, SCSI disks, SATA disks, SAS disks and the like, and storage devices that will be developed in the future, can also be used. For example, the disks used are not limited to hard disk drives; there are also cases in which the low-speed volume 4 and high-speed volume 5 can be respectively constructed using semiconductor memory drives, optical disk drives or the like.

The low-speed volume 4 holds all of the data utilized by the host 2, and the high-speed volume 5 stores only the portion of the data that is relatively new among the data stored in the low-speed volume 4. As will be described later, a storage period (life tag) is set beforehand is the data that is stored in the high-speed volume 5, and data for which this storage period has elapsed is erased from the high-speed volume 5. Accordingly, the data that is erased from the high-speed volume 5 is stored only in the low-speed volume 4.

The control part 3 processes data access requests from the host 2, and controls the overall operation of the storage device 1. The control part 3 can be constructed by causing the cooperation of a plurality of control packages, or can be constructed as a single controller.

An updating bit map table 6A and a life tag control table 6B are stored in the memory 6 of the control part 3. Furthermore, a virtual volume 7 is constructed in the storage space of the memory 6. The virtual volume 7 is formed in the storage space of the memory 6, and comprises the same size storage capacity as the low-speed volume 4. The actual body of the virtual volume 7 is the low-speed volume 4 and high-speed volume 5.

The updating bit map table 6A is control information which controls whether or not the data that is stored in the storage space of the virtual volume 7 is present in the high-speed volume 5. The life tag control table 6B is control information that is used to control the storage period (life tag) that is set beforehand in the virtual volume 7. The life tag is information which indicates the period for which the data is to be stored in the high-speed volume 5. For example, this life tag can be set in stages such as 1 day, 1 week, 1 month or the like for each virtual volume 7. In other words, the data stored in a certain virtual volume 7 can be held in the high-speed volume 5 for one day, and the data stored in another virtual volume 7 can be held in the high-speed volume 5 for one week. In FIG. 1, only a single virtual volume 7 is shown for convenience of description; however, the storage device 1 may comprise a plurality of virtual volumes 7.

In addition to data, an updating segment control table 8 can be stored in the high-speed volume 5. For example, this updating segment control table 8 can be constructed by associating the segment (data storage unit) positions in the high-speed volume 5 updated by the host 2, the segment positions in the low-speed volume 4 where data corresponding to these updating segments is stored, the updating time, the storage period (life tag) in the high-speed volume 5 and the like. Furthermore, it is not necessary that this data be controlled by a single table; the data can also be controlled by causing a plurality of tables to cooperate. Furthermore, all or part of the updating segment control table 8 may be stored in the memory 6.

Next, the operation of the present embodiment will be described. First, the storage device 1 provides a virtual volume 7 to the host 2. The host 2 recognizes the virtual volume 7 as a physical disk. The application 2A of the host 2 issues write commands to the virtual volume 2 (S1).

When the control part 3 of the storage device 1 receives a write command from the host 2, the control part 3 temporarily stores the write data transmitted from the host 2 in the memory 6, and sends back a completion of writing to the host 2. The control part 3 first writes the write data into the high-speed volume 5 (S2), and then also writes this write data into the low-speed volume 4 at a specified timing (S3). Here, write data is written into the low-speed volume 4 in the same position as the position in the virtual volume 7. Write data is written into the high-speed volume 5 regardless of the position in the virtual volume 7.

When write data is written into the high-speed volume 5, the updating bit map table 6A sets a flag for the segment that is updated by this write data. This flag is information which indicates that the data of this segment is present in a specified position in the high-speed volume 5. The segment in which the write data is stored and the life tag associated with this write data are respectively registered in the updating segment control table 8 in the high-speed volume 5.

The control part 3 periodically refers to the updating segment control table 8, and detects data for which the storage period has expired among the data stored in the high-speed volume 5. Then, the control part 3 erases the data for which the storage period has elapsed from the high-speed volume 5 (S4). Furthermore, the data need not be physically erased; it is sufficient if the data is made logically invalid. Specifically, the segments that are controlled by the updating bit map table 6A can be invalidated, and these segments can be used to store other new write data by allowing overwriting.

Thus, in the present embodiment, write data from the host 2 can be stored in the high-speed volume 5 for a preset storage period, and data for which the storage period has elapsed can be erased from the high-speed volume 5 and stored only in the low-speed volume 4. In other words, from the time that write data is received until the time that the storage period has elapsed, this write data is stored in both the low-speed volume 4 and high-speed volume 5, and after the storage period has elapsed, this write data is stored only in the low-speed volume 4.

Accordingly, only data with a high utilization frequency can be stored in the high-speed volume 5, so that the response characteristics for data with a high utilization frequency can be improved. Furthermore, write data is written into both the low-speed volume 4 and high-speed volume 5, and data with a low utilization frequency is erased from the high-speed volume 5 after the storage period has elapsed; accordingly, there is no bother of writing data with a low utilization frequency into the low-speed volume 4 alone.

Furthermore, since the data life cycle can be controlled within the storage device 1, there is no need to install new software or the like on the side of the host 2. Moreover, there is no need for the user to confirm the utilization frequency and select data that is the object of movement, or to issue an instruction to move the selected data to another volume; accordingly, easy and effective data life cycle control can be realized. The present embodiment will be described in greater detail below.

1. First Embodiment

Figure 2:
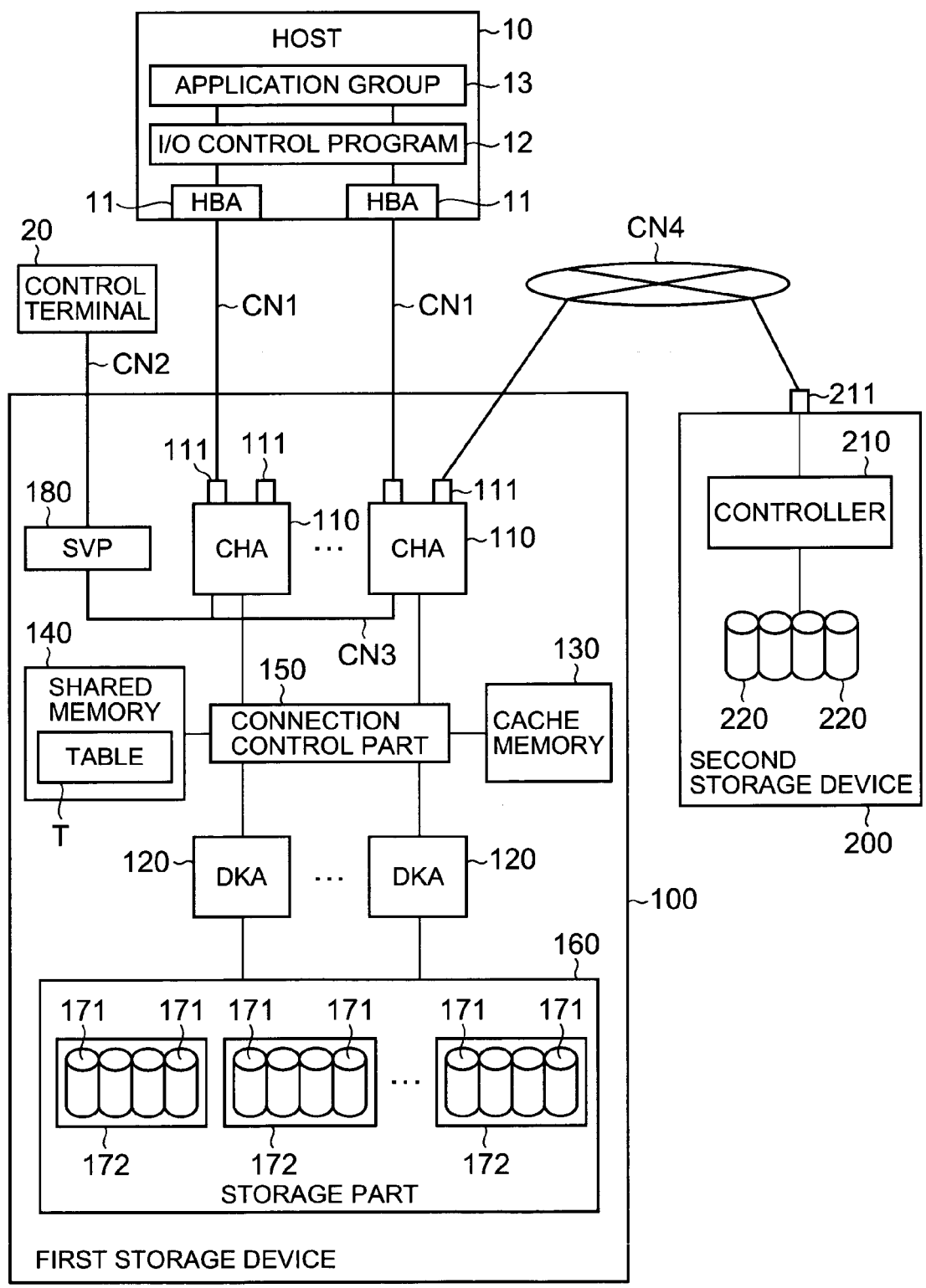
FIG. 2 is an overall structural diagram of the storage system of a first embodiment of the present invention.

FIG. 2 is a block diagram showing an overall outline of a storage system containing a storage device 100. As will be described later, this storage system can be constructed so that this system contains one or more hosts 10, and one or a plurality of storage devices 100 and 200.

For example, hosts 10 can be roughly divided into so-called open type hosts and main frame type hosts. Examples of open type hosts include sever machines in which a common OS (operating system) such as Windows (registered trademark), UNIX (registered trademark) or the like is installed, and which access the storage device 100 via a relatively all-purpose communications protocol such as FC (fiber channel), iSCSI (internet SCSI), TCP/IP (transmission control protocol/internet protocol) or the like. Examples of main frame type hosts include main frame machines which access the storage device 100 via a communications protocol such as FICON (Fiber Connection: registered trademark), ESCON (Enterprise System Connection: registered trademark), ACONARC (Advanced Connection Architecture: registered trademark), FIBARC (Fiber Connection Architecture: registered trademark) or the like.

For example, the host 10 is connected to the storage device 100 via a communications network CN1 which may contain a metal cable, optical fiber cable, switch or the like. For example, the host 10 can be constructed so that this host comprises one or a plurality of HBAs (host bus adapters) 11, an input/output (I/O) control program 12. and an application program group (shown as "application group" in the figure). In FIG. 1, for convenience of description, only a single host 10 is shown; however, a plurality of hosts may be provided. Furthermore, open type hosts and main frame type hosts may be mixed.

Here, each HBA 11 transmits and receives data on the basis of a specified protocol. For example, the I/O control program 12 is a driver program that controls the data input/output performed using the HBAs 11. The application program group 13 is an email serving program or a program such as data base control software, a file system or the like, and respectively provides a specified information processing service to client terminals not shown in the figures.

The control terminal 20 is a device which is used to collect various types of information for the storage device 100, and to send necessary commands to the storage device 100 via a service processor (SVP) 180 described later. For example, the control terminal 20 is connected to the SVP 180 via a communications network CN2 such as an LAN (local area network) or the like. For instance, the control terminal 20 comprises a GUI (graphical user interface) based on a web browser, and performs the collection of various types of information and the input of commands by logging into a WWW (world wide web) server provided by the SVP 180. In the present embodiment, for example, life tag setting work is performed via the control terminal 20. Furthermore, the present invention is not limited to cases where control is performed via the control terminal 20; control can also be performed from the host 10.

For example, the storage device 100 can be constructed so that this storage device comprises a plurality of CHAs 110, a plurality of DKAs 120, a cache memory 130, a shared memory 140, a connection control part 150, a storage part 160, and an SVP 180.

A plurality of CHAs 110 can be installed in the storage device 100. The respective CHAs 110 are control packages that control data transfer with the respective hosts 10. Each CHA 110 comprises a plurality of communications ports 111, and can be connected with one or more hosts 10. Each CHA 110 can seperately control data transfer with a plurality of hosts 10. Furthermore, one CHA 110 can control data communications with a second storage device 200 positioned on the outside.

A plurality of DKAs 120 can be installed in the storage device 100. Each DKA 120 can respectively control data transfer with the storage part 160. For example, each DKA 120 can access respective disk drives 171, and can read out data or write data, by converting logical block addresses (LBAs) designated by the host 10 into physical disk addresses.

The cache memory 130 is a memory that stores write data that is written in from the host 10 and read data that is read out from the host 10. For example, the cache memory 130 can be constructed by a volatile or nonvolatile memory. In cases where the cache memory 130 is constructed so as to include a volatile memory, it is desirable that memory backup be performed by a battery power supply or the like not shown in the figures.

For example, the cache memory 130 can be constructed by a read cache region and a write cache region. For example, the write cache region may include a cache aspect and an NVS (non-volatile storage) aspect, so that the write data is stored in multiplex storage (redundant storage).

The shared memory (also called a control memory) 140 can be constructed by (for example) a nonvolatile memory; however, this shared memory can also be constructed by a volatile memory. For example, control information, management information and the like are stored in the shared memory 140. Information such as this control information and the like can be controlled by multiplex control in a plurality of memories 140.

The shared memory 140 and cache memory 130 can be respectively constructed as separate memories, or the cache memory 130 and shared memory 140 can be disposed inside the same memory package. Furthermore, a portion of one memory can be used as a cache region, and another portion of this memory can be used as a control region. In other words, the shared memory and cache memory can also be constructed as the same memory of memory group.

The connection control part 150 connects the respective CHAs 110, the respective DKAs 120, the cache memory 130 and the shared memory 140 to each other. As a result, all of the CHAs 110 and DKAs 120 can separately access the cache memory 130 and shared memory 140. For example, the connection control part 150 can be constructed as an ultra-high-speed cross bar switch or the like.

Furthermore, as will be described later, the CHAs 110, DKAs 120, cache memory 130 and shared memory 140 can be concentrated in one or a plurality of controllers.

The storage part 160 can be constructed so as to comprise numerous disk drives 171. The storage part 160 can disposed inside the same housing together with the controller parts such as the respective CHAs 110 and respective DKAs 120, or can be disposed inside another housing separate from the controller parts.

For example, the storage part 160 can be constructed so that a plurality of different types of disk drives 171 are mixed. Examples of disk drives 171 that can be used include FC disks (fiber channel disks), SCSI (small computer system interface) disks, SATA (serial AT attachment) disks and the like. Furthermore, the types of disks used are not limited to the abovementioned disks; storage devices comparable to the disk drives shown as examples, or storage devices that may be developed in the future may also be used in some cases.

A plurality of parity groups (also called RAID groups) can be disposed in the storage part 160. The respective parity groups 172 are respectively constructed by the same type of physical disks 171. Specifically, certain parity groups 172 are constructed only from FC disks, while other parity groups are constructed only from SATA disks.

Furthermore, details will be described later; however, one or more logical volumes (also called LDEVs) 173 can be disposed in the logical storage regions respectively provided by the respective parity groups 172. By associating logical volumes 173 with LUs (logical units) 174, the open type host 10 can recognize and utilize these volumes as physical storage devices. Furthermore, the volumes that are the object of access by the open type host 10 are LUs; however, the object of access of the main frame type host 10 is logical volumes (LDEVs).

The memory resources used by the storage device 100 need not all be present within the storage device 100. As will be described later, the storage device (which may also be called the first storage device) 100 can incorporate and utilize the memory resources of the of the second storage device 200 located outside the storage device 100 as though these memory resources were its own memory resources.

For example, the SVP 180 can be respectively connected to the respective CHAs 110 and respective DKAs 120 via an internal network CN3 such as an LAN or the like. The SVP 180 collects various states inside the storage device 100, and provides these states to the control terminal 20 either "as is" or after processing. Furthermore, the SVP 180 can also register data input from the control terminal 20 in various tables T inside the shared memory 140.

For example, the second storage device 200 can be constructed so that this storage device comprises a controller 210 and a disk drive 220. The controller 210 respectively controls the exchange of data with external devices (host 10 and storage device 100), and the exchange of data with the disk drive 220. The second storage device 200 may have substantially the same construction as the storage device 100, or may have a different construction from the storage device 100.

Figure 3:
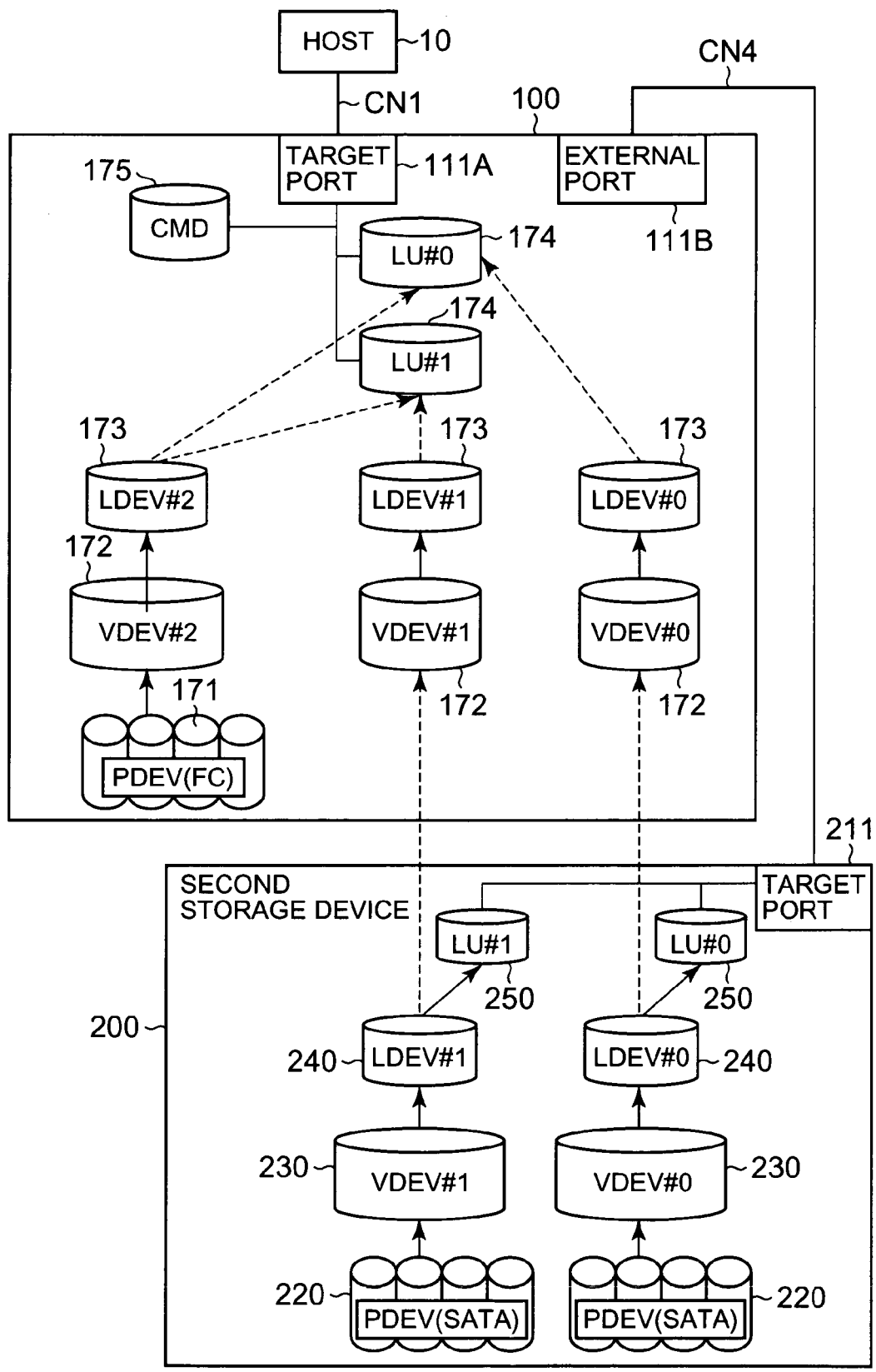
FIG. 3 is an explanatory diagram which shows the storage structure of the storage device.

For example, the second storage device 200 is directly connected to the storage device 100 via a communications network CN4 such as an SAN (storage area network) or the like. In concrete terms, as is shown in FIG. 3, the external communications port 111B of the storage device 100 and the target port 211 of the second storage device 200 are connected via the communications network CN4 so that two-way data communications are possible. Furthermore, the second storage device 200 can perform the reading or writing of data from or into the disk drives 220 in response to read requests or write requests from the storage device 100.

FIG. 3 is a structural explanatory diagram focusing on the storage structure of the storage device 100. The storage structure of the storage device 100 can be constructed by a PDEV (physical device) 171 which is a physical disk, a VDEV (virtual device) 172 which is a virtual storage region provided by a plurality of PDEVs 171 formed into a group, and an LDEV (logical device) 173 set in this VDEV 172. Here, the PDEVs 171 correspond to the disk drives 171 in FIG. 2, and the VDEVs 172 correspond to the parity groups 172 in FIG. 2.

Here, LUNs (logical unit numbers) are respectively assigned to several logical volumes (LDEVs), and these are recognized as LUs 174 by the open type host 10. The host 10 respectively accesses certain logical volumes (LUs 174) that have access authorization via the target port 111A. The target port 111A corresponds to the communications port 111 provided by the respective CHAs 110 in FIG. 2.

A plurality of LDEVs 173 can be respectively disposed in the VDEVs 172. One LDEV 173 can be associated with one LU 174, or a plurality of LDEVs 173 can be associated with one LU 174. Alternatively, a plurality of LDEVs 173 disposed in respective separate VDEVs 172 can be associated with one LU 174.

The VDEV "# 0" and VDEV "# 1" shown on the right side of FIG. 3 are virtual intermediate devices, and the actual storage regions are present inside the second storage device 200. In other words, the storage structure of the second storage device 200 can also be constructed so as to comprise PDEVs 220, VDEVs 230, and LDEVs 240. The LDEVs 240 are associated with LUs 250. The LDEVS "# 0" and "# 1" as real volumes of this second storage device 200 are respectively associated with the virtual intermediate devices VDEV "# 0" and "# 1" of the storage device 100.

For example, the disk drives 171 of the storage device 100 can be constructed from high-speed FC disks, and the disk drives 220 of the second storage device 200 can be constructed from low-speed SATA disks. Accordingly, the high-speed volumes produced inside the storage device 100 are high-speed volumes, and the volumes of the second storage device 200 are low-speed volumes.

In the present embodiment, the optimal disposition of data can be achieved by effectively utilizing the high-speed volume which is high-speed within the storage device 100 and the low-speed volume which is low-speed within the second storage device 200. Furthermore, a construction in which both a high-speed volume and low-speed volume are disposed inside the storage device 100, or a construction in which both a high-speed volume and low-speed volume are disposed outside the storage device 100 may be used.

Figure 4:
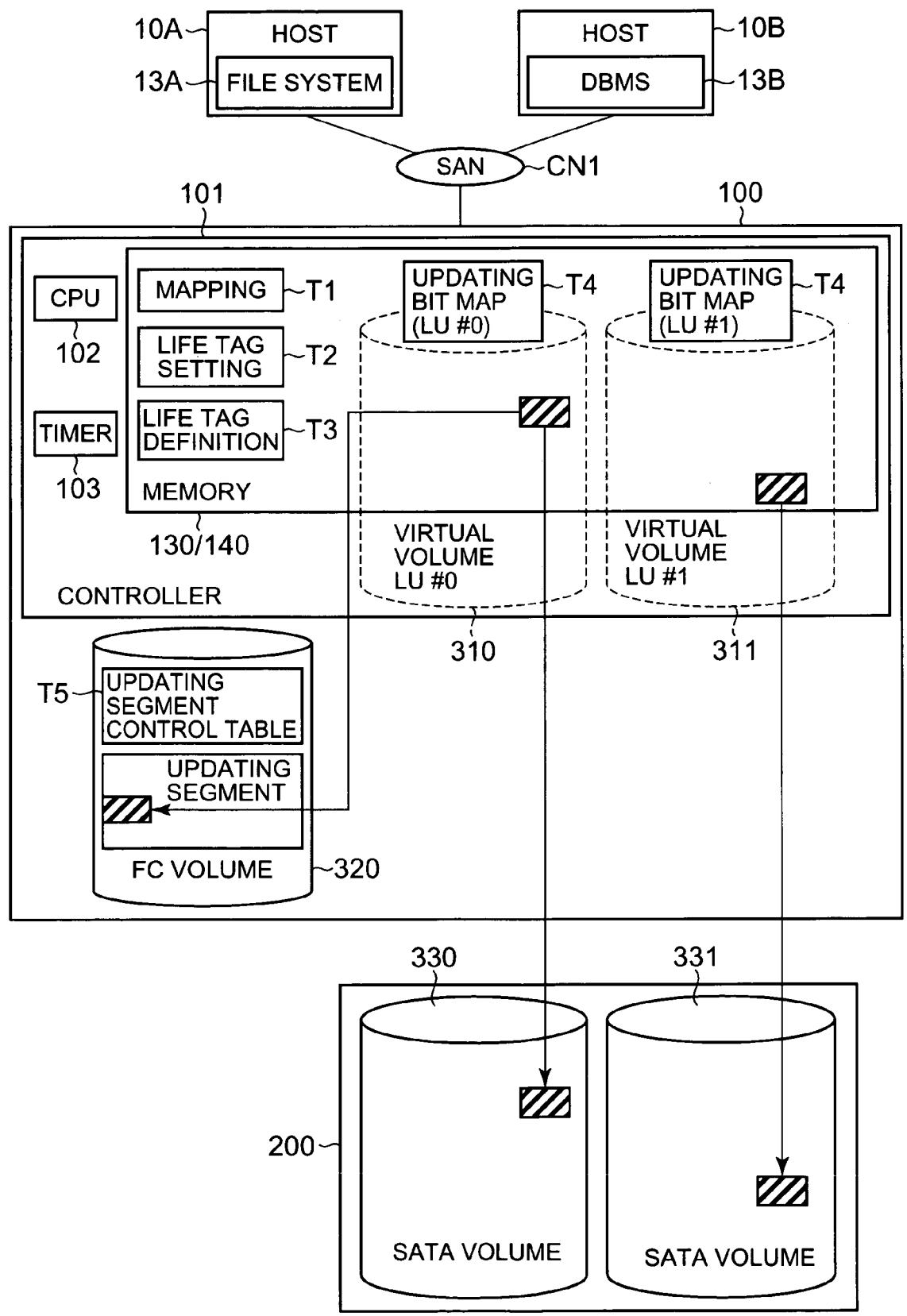
FIG. 4 is a structural explanatory diagram showing the construction of the first embodiment in model form.

FIG. 4 is a schematic structural diagram focusing on the main construction of the storage device 100. The controller 101 of the storage device 100 concentrates the control functions of both the respective CHAs 110 and respective DKAs 120. The controller 101 controls the overall operation inside the storage device 100. For example, the controller 101 can comprise a CPU 102, timer 103, cache memory 130 and shared memory 140. Furthermore, in FIG. 4, for convenience of description, the cache memory 130 and shared memory 140 are not distinguished, but are shown as a memory 130/140.

For example, a mapping table T1, life tag setting file T2, life tag definition table T3 and updating bit map table T4 can be respectively stored in the memory 130/140. The mapping table T1 is a table that controls the association of real volumes with respective LUs (virtual volumes described later). The life tag setting table T2 is a table that is used to set life tags that indicate the data storage periods for respective LUs. The life tag definition table T3 is a table that is used to define the periods indicating the set life tags. The updating bit map table T4 is a table provided for each LU, which indicates which data is stored in high-speed FC volumes 320 and the like. Furthermore, details of the respective tables T1 through T4 will be further described later.

A plurality of virtual volumes 310 and 311 can be constructed in the memory 130/140. The storage space of the memory 130/140 (especially the cache memory 130 for example) is controlled by being divided into segments of specified amounts, so that the respective virtual volumes 310 and 311 are respectively constructed from numerous segments. The respective virtual volumes 310 and 311 respectively have the same storage capacities as the low-speed SATA volumes 330 and 331 provided by the second storage device 200. These SATA volumes respectively correspond to the respective LDEVs 240 "# 0" and "# 1" in FIG. 3.

The storage device 100 comprises an FC volume 320. This FC volume 320 corresponds to the LDEV 172 "# 2" in FIG. 3. The FC volume 320 is respectively associated with a plurality of virtual volumes 310 and 311. In addition to data storage regions (indicated as "updating segments" in FIG. 4), an updating segment control table T5 is stored in the FC volume 320. Details of the updating segment control table T5 will be described later; however, this is a table that controls the correspondence relationship, storage periods and the like of the data stored in the FC volume 320 and the data stored in the SATA volumes 330 and 331.

In FIG. 4, the file system 13A of the host 10A utilizes the virtual volume 310, and the DBMS (data base management system) 13B of the host 10B utilizes the second virtual volume 311. Furthermore, as was described above, the first virtual volume 310 is constructed from the first SATA volume 330 and FC volume 320, and the second virtual volume 311 is constructed from the second SATA volume and FC volume 320.

The detailed operation will be further described later; however, in cases where the hosts 10A and 10B write data into the virtual volumes 310 and 311, this write data is temporarily stored in the memory 130/140 (especially the cache memory 130 for example), and is then written into the FC volume 320. Then, considering the load on the storage device 100 and the like, the write data is also written into the SATA volumes 330 and 331 at a specified timing. Here, the write positions in the virtual volumes 310 and 311 are the same as the write positions in the SATA volumes 330 and 331.

The data that is stored in the FC volume 320 is present in the FC volume 320 until the storage periods preset for each of the virtual volumes 310 and 311 have elapsed. The data for which the storage period has elapsed is erased from the FC volume 320, and is stored only in the SATA volumes 330 and 331.

The desired data is read out from the SATA volumes 330 and 331 and provided to the hosts 10A and 10B only in cases where the desired data is not stored in the FC volume 320. As a result, the hosts 10A and 10B can mainly read and write data utilizing the high-speed FC volume 320.

FIG. 5 is an explanatory diagram showing an example of the construction of the mapping table T1. For example, the mapping table T1 can be stored in the shared memory 140. Furthermore, the same is also true of the respective tables described below; however, all or part of the mapping table T1 can also be copied into the local memories inside the respective CHAs 110.

For example, the mapping table T1 can be constructed by associating the LUNs, the LDEV numbers and LDEV sizes (slot numbers) associated with these LUNs, the VDEV numbers and VDEV sizes associated with these LDEVs, the device types of these LDEVs, and the path information for the disk drives in which these VDEVs are formed. As is shown in FIG. 5, in cases where the volumes of the external second storage device 200 are incorporated and used, the paths used to access the volumes of the second storage device 200 are set in the path information. Furthermore, in cases where volumes inside the storage device 100 are used (the FC volume 320 in the present embodiment), information used to access these internal volumes is set.

Figure 6:
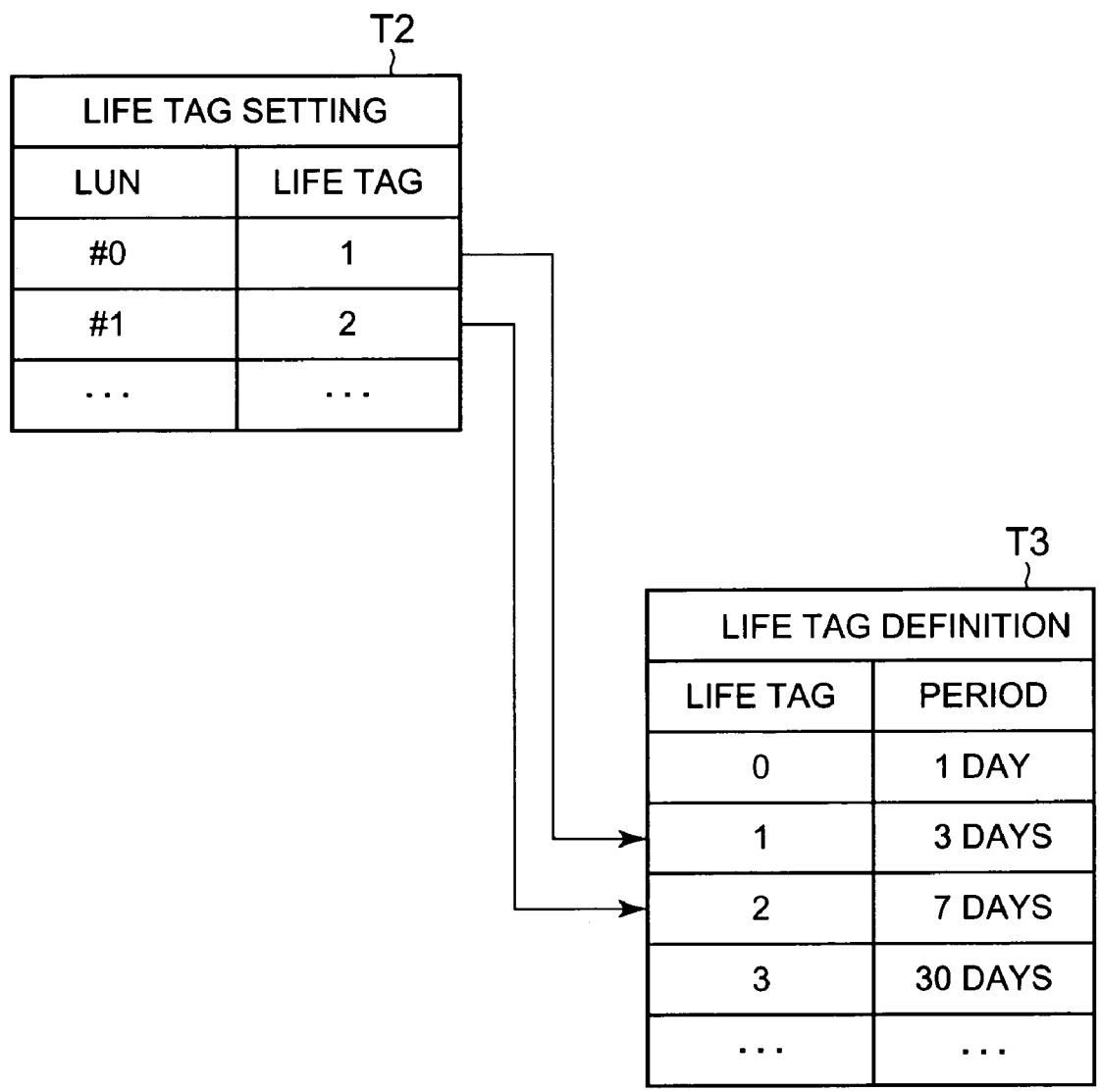
FIG. 6 is an explanatory diagram respectively showing the life tag setting table and the life tag definition table.

FIG. 6 is an explanatory diagram which respectively indicates examples of the construction of the life tag setting table T2 and life tag definition table T3. For example, these respective tables T2 and T3 can be stored in the shared memory 140. In the life tag setting table T2, for example, the LUNs and life tags are associated. Specifically, for each LUN, respectively different life tags can be set for each virtual volume 310 and 311. For example, a plurality of levels such as 0, 1, 2, 3 and the like exist for the life tags.

For example, the life tag definition table T3 defines concrete storage periods for each life tag level. For instance, storage periods are respectively defined for each life tag level, such as 1 day in a case where the life tag is "0", 3 days in a case where the life tag is "1", 7 days in cases where the life tag is "2", 30 days in cases where the life tag is "3" and the like. The life tag setting and life tag definition can be respectively set by the user via the control terminal 20.

Figure 7:
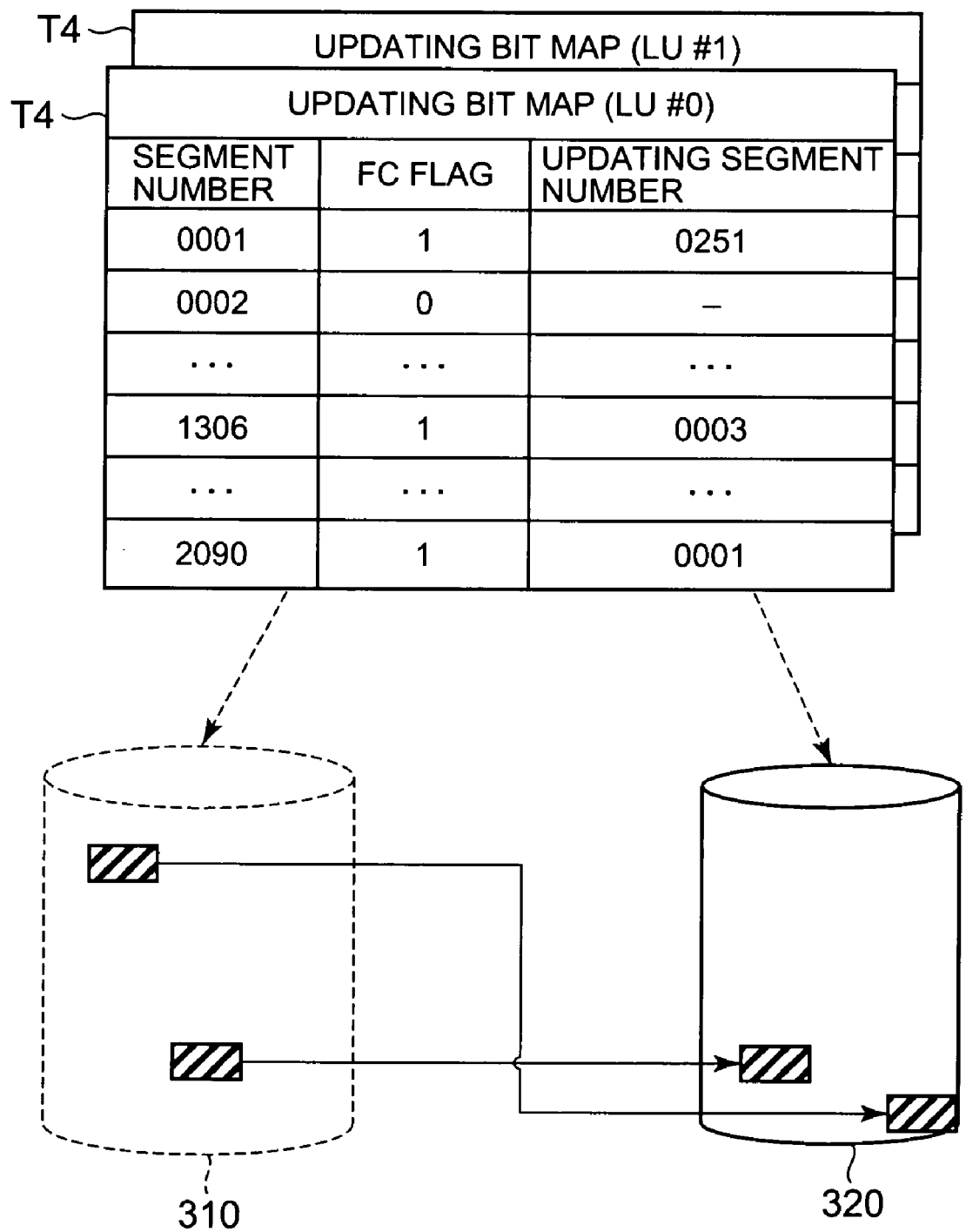
FIG. 7 is an explanatory diagram showing the construction of the updating bit map table.

FIG. 7 is an explanatory diagram which shows an example of the construction of the updating bit map table T4. For example, the updating bit map table T4 can be respectively set for each virtual volume 310 and 311 and each LUN, and can be stored in the shared memory 140.

The respective updating bit map tables T4 can be constructed (for example) by associating the segment numbers in the cache memory 130, the FC flags, and the updating segment numbers in the FC volume 320.

Here, the FC flag is information that indicates whether or not the data of the segment in question is present in the FC volume 320. In cases where "1" is set in the FC flag, this indicates that the data of this segment is stored in the FC volume 320. In cases where "0" is set in the FC flag, this indicates that the data of this segment is not present in the FC volume 320.

The segment number indicates the storage position of the data in the virtual volumes 310 and 311 constructed in the cache memory 130. As was described above, the data storage positions in the virtual volumes 310 and 311 are the same as the data storage positions in the respective SATA volumes 330 and 331. The updating segment number indicates the data storage position in the FC volume 320. The data storage position (updating segment number) in the FC volume 320 does not coincide with the segment numbers in the virtual volumes 310 and 311. In order to utilize the storage region of the FC volume effectively, for example, data is stored in order in empty updating segments.

Figure 8:
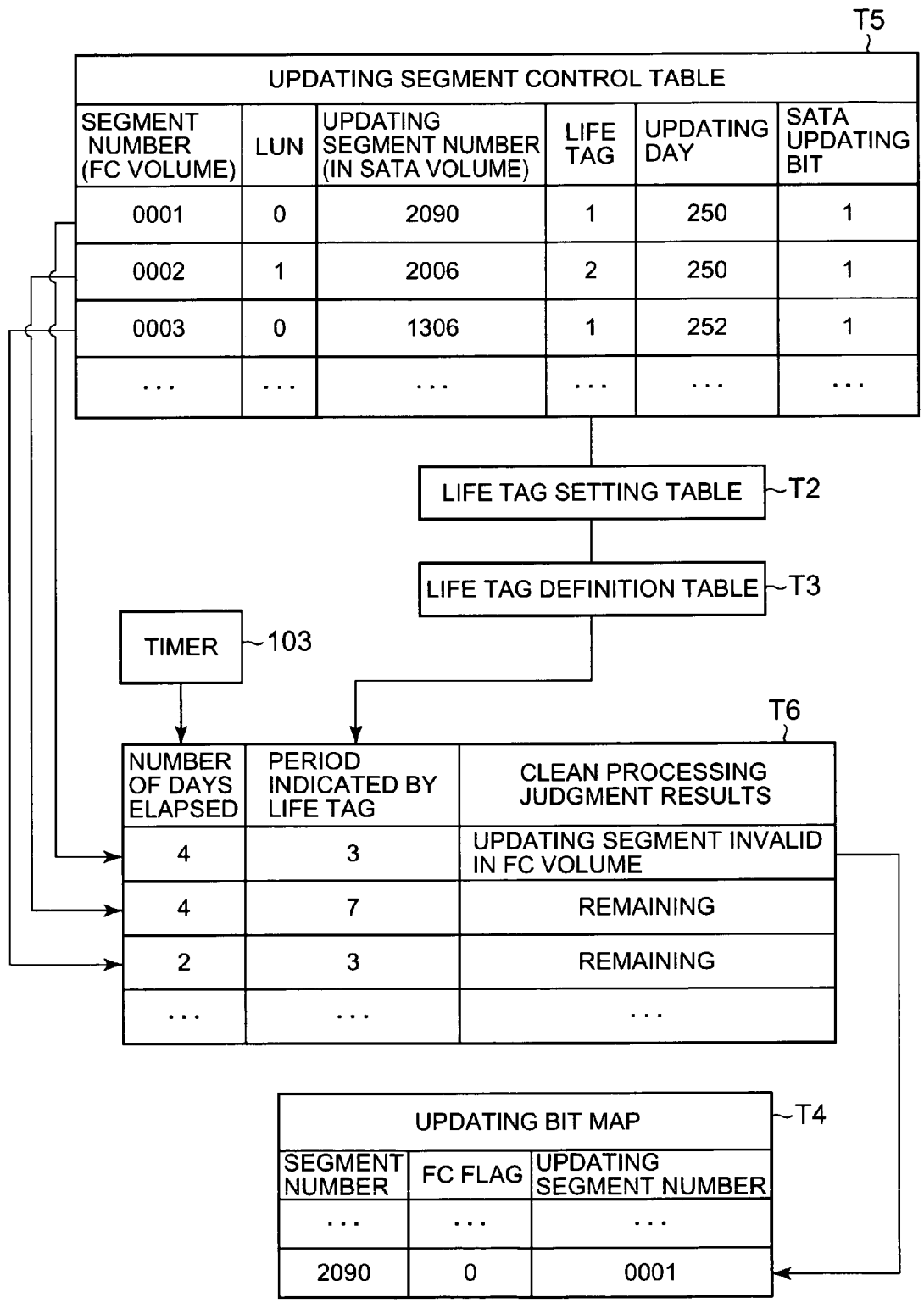
FIG. 8 is an explanatory diagram showing the construction of the updating segment control table and how data whose storage period has elapsed is erased using the updating segment control table.

FIG. 8 is an explanatory diagram which shows the construction of the updating segment control table T5, and which also shows how data for which the storage period has elapsed is erased from the FC volume 320 using the updating segment control table T5 and the like.

For example, the updating segment control table T5 can be constructed by associating the segment numbers that indicate the storage positions in the FC volume 320 (corresponding to the updating segment numbers in FIG. 7), the LUNs (virtual volume numbers) to which the data stored in these segments belong, the updating segment numbers (corresponding to the segment numbers in FIG. 7) that indicate the storage positions in the SATA volumes 330 and 331 storing the same data as the data stored in these segments, the life tag levels (storage periods) of the data stored in these segments, the time of updating of these segments, and SATA updating bits indicating whether or not the data stored in these segments is also stored in the SATA volumes 330 and 331.

It is not necessary to set the updating time in a year, month and day format; as is shown in FIG. 8, it is sufficient if a value counted by the timer 103 is set. The timer 103 increases the count by one increment for each day. Accordingly, by comparing the count values of the timer 103, it is possible to determined the number of days elapsed from the point in time at which a certain count value was recorded. Furthermore, the updating date can also be registered using a year, month and day format.

The controller 101 refers to the updating segment control table T5 either periodically or irregularly, and compares the storage time indicated by the life tag with the time elapsed to the current point in time for the respective segments (only segments in which data is stored) in the FC volume 320. It is sufficient if this comparison is performed at least once a day. Furthermore, the comparison table T6 shown in FIG. 8 is shown for convenience of description; it is also possible to perform data cleaning processing without producing a comparison table T6.

For example, when reference is made to the updating segment control table T5, the data stored in the segment "#0001" of the FC volume 320 belongs to the virtual volume 330 "# 0"; accordingly, "1" is associated as the life tag level. The storage period in the case of a life tag level of "1" is 3 days. Furthermore, when this data was stored in the segment "#0001" of the FC volume 320, it is assumed that the count value of the timer 103 was "250".

It is assumed that the count value of the timer 103 is currently "254". Thus, a period of 4 days has already elapsed since the updating of the data stored in segment "#0001" of the FC volume 320. However, the storage period of this data is set at 3 days. Accordingly, the controller 101 invalidates the updating segment of the updating bit map table T4 (corresponding to the segment of the FC volume), and permits overwriting. As a result, other new data can be stored in the segment storing data for which the storage period has elapsed.

Figure 9:
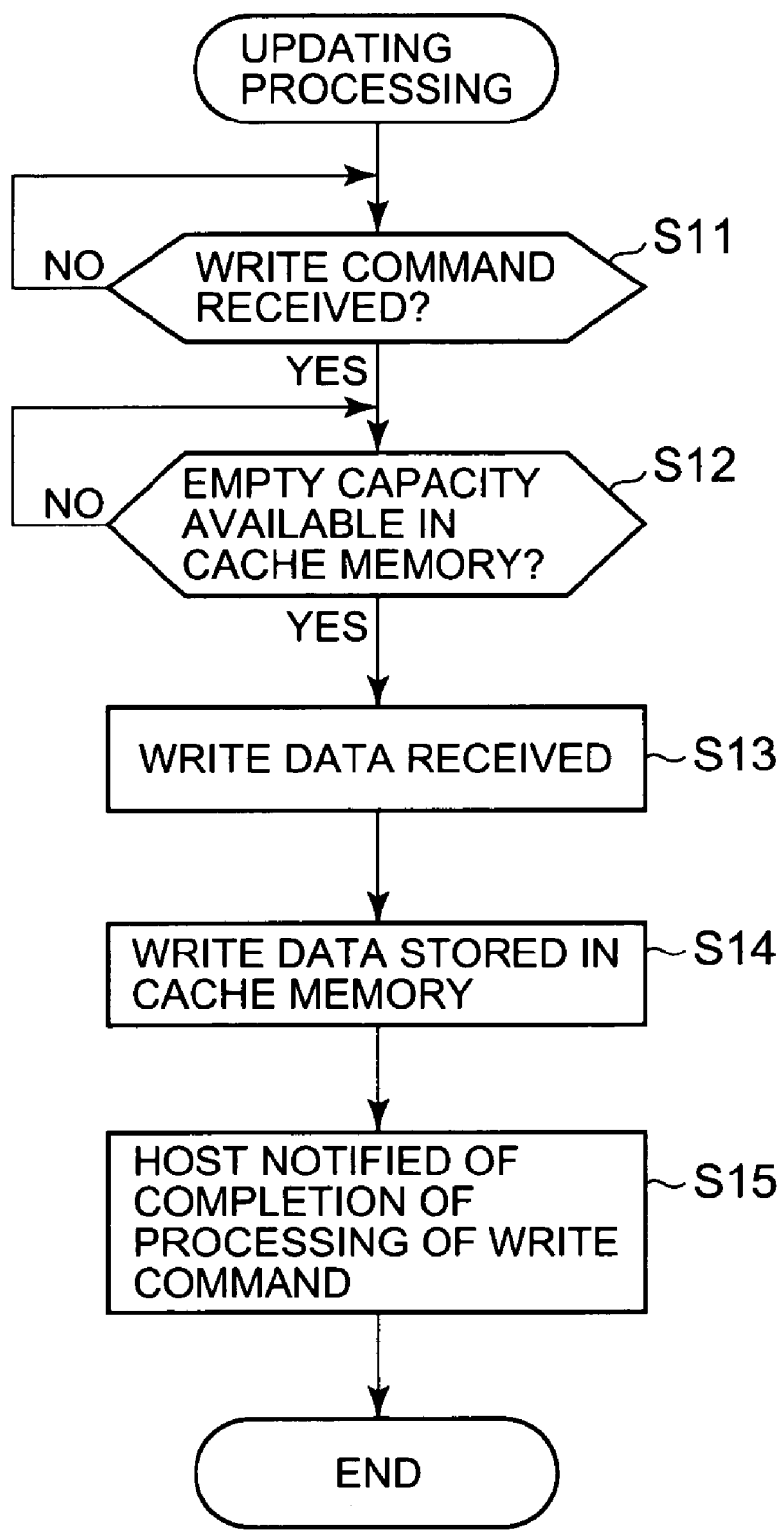
FIG. 9 is a flow chart showing the updating processing.

FIG. 9 is a flow chart showing an outline of the updating processing. For example, this processing is executed by the CHA 110; however, in the following description, the main body of the operation is described as being the controller 101.

The controller 101 receives a write command from the host 10 (S11: YES), and judges whether or not any empty capacity for storing write data is present in the cache memory 130 (S12). If the empty capacity required for the storage of the write data is not present (S12: NO), the controller 101 causes the host 10 to wait until this empty capacity is formed. As will be described in the destage processing described later, the data stored in the cache memory 130 is successively written into the FC volume 320, and the data written into the FC volume 320 is erased from the cache memory 130. Accordingly, while the host 10 is being caused to wait for the transmission of write data, the data in the cache memory 130 is written into the FC volume, so that the empty capacity is increased.

Then, when the required empty capacity is formed (S12: YES), the controller 101 allows the host 10 to transmit write data, and receives the write data transmitted from the host 10 (S13). After the controller 101 stores the write data received from the host 10 in the cache memory 130 (S14), the controller 101 notifies the host 10 of the completion of the write command (S15). Specifically, at the point in time at which the controller 101 redundantly stores the write data in the cache memory 130, the controller notifies the host 10 of the completion of the write command, and the writing of the write data into the volume is performed at a different timing. This mode in which the timing at which the write data is written into the volume and the timing at which the host 10 is notified of the completion of the command are thus different can be called the "asynchronous write mode". By using this asynchronous write mode, it is possible to release the host 10 early from writing processing.

Figure 10:
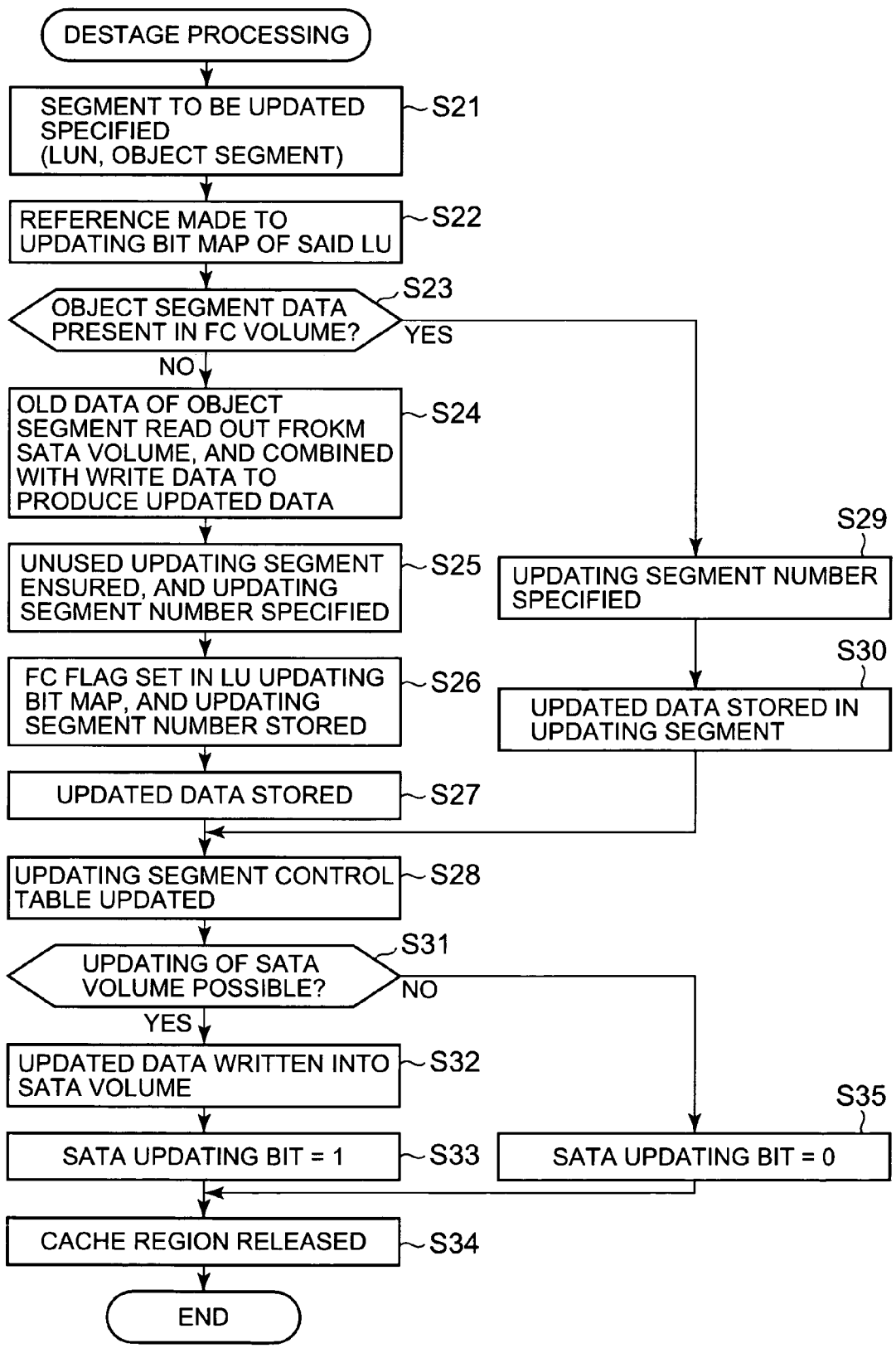
FIG. 10 is a flow chart showing the destage processing.

FIG. 10 is a flow chart showing an outline of the destage processing. For example, this processing can be executed by a DKA 120; in the following description, however, the main body of the operation will be described as the controller 101.

On the basis of a write command, the controller 101 specifies the segment that is to be updated by the write data (S21). For example, the segment that is to be updated can be specified from the LUN (virtual volume number) into which the write data is written and the LBA in which the write data is to be stored.

The controller 101 refers to the updating bit map table T4 associated with the LU (virtual volume) into which the write data is to be written (S22), and judges whether or not the data of the segment that is the object of updating is present in the FC volume 320 (S23).

If the data of the segment that is the object of updating is not stored in the FC volume 320 (S23: NO), the controller 101 reads out old data from the SATA volume corresponding to the virtual volume that is the object of updating, joins this old data and the write data, and produces the full data of the segment that is the object of updating (S24).

Furthermore, in cases where the old data is stored in the cache memory 130, there is no need to read out data from the SATA volume; the data stored in the cache memory 130 may be used. In ordinary cases, since reference processing is executed prior to updating processing, and old data is read out from the cache memory 130, the possibility of a cache hit is high. In cases where the old data is stored in the cache memory 130, there is no need to access the low-speed SATA volume and read out data, so that the response characteristics are improved.

Next, the controller 101 ensures a specified number of segments that are not being used in the FC volume 320, and specifies (confirms the updating segment number in which updated data is to be stored (S25).

The controller 101 registers the specified updating segment number in the updating bit map table T4, and sets the FC flag as "1" for this updating segment (S26). Next, the controller 101 stores the updated data in the updating segment registered in the updating bit map table T4 (S27), and updates the updating segment control table T5 (S28).

On the other hand, in cases where data of the segment that is the object of updating is present in the FC volume 320 (S23: YES), the controller 101 specifies the segment number that is the object of updating (S29), and stores the updated data in this specified segment (S30). Furthermore, in S30, the controller 101 rewrites the updating date of this segment to the current date (most recent count value of the timer 103), and updates the updating segment control table T5 (S28).

Thus, after write data received from the host 10 is stored in the high-speed FC volume 320, the controller 101 judges whether or not the SATA volume can be updated (S31). The writing of data into the FC volume 320 and the writing of data into the SATA volume can be performed simultaneously, or write data can be written into the SATA volume at a shifted timing. For example, the controller 101 can update the SATA volume at a timing at which the processing burden on the storage device 100 is relatively small.

In cases where the SATA volume can be updated (S31: YES), the controller 101 writes the updated data into a specified storage position in the SATA volume corresponding to the virtual volume that is the object of updating (S32), sets "1" in the SATA updating bit corresponding to this segment (S33), and updates the updating segment control table T5. Then, the controller 101 releases the storage region in which the write data was stored in the cache memory 130 (S34). As a result, other data can be overwritten in the storage region in which this write data was stored.

On the other hand, in cases where the SATA volume cannot be updated because of a heavy processing burden on the storage device 100 or the like (S31: NO), the controller 101 sets "0" in the SATA updating bit corresponding to the updated segment in the FC volume 320 (S35), erases the write data stored in the cache memory 130, and releases the storage region (S34).

Thus, in the destage processing, the write data received from the host 10 is first stored in the high-speed FC volume 320, and the write data is also stored in the SATA volume either substantially simultaneously with the storage in the FC volume 320, or with some delay following this storage. Furthermore, in cases where the write data is stored in the FC volume 320, regardless of whether or not the write data is stored in the SATA volume, the write data in the cache memory 130 is erased, so that an empty capacity is produced.

Figure 11:
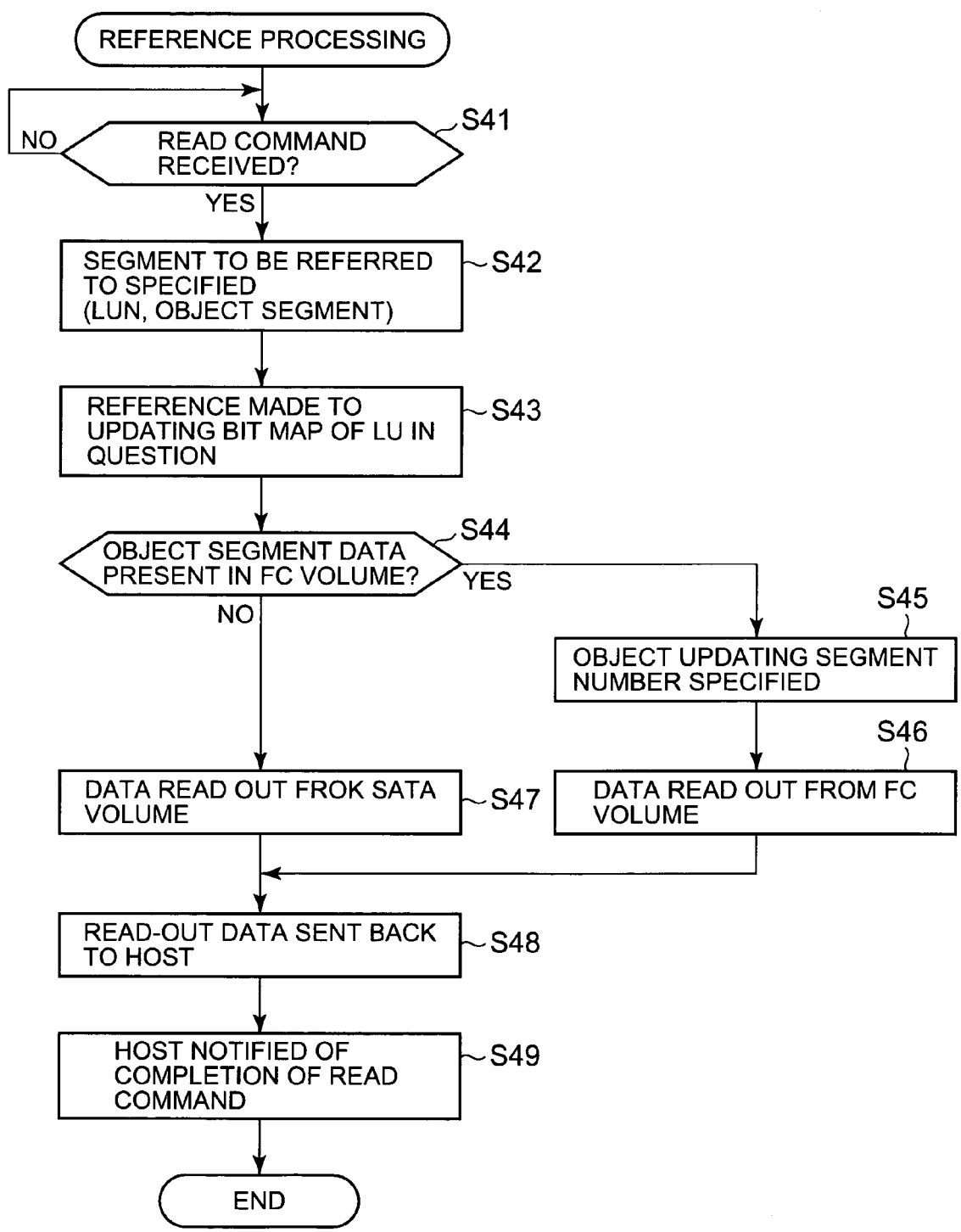
FIG. 11 is a flow chart showing the reference processing.

FIG. 11 is a flow chart which shows an outline of the reference processing. When the controller 101 receives a read command from the host 10 (S41: YES), the controller 101 specifies the segment to which reference is to be made by analyzing the read command (S42). For example, the reference segment can be specified by means of the LUN (virtual volume number) that is the object of reference and the segment number that is the object of reference.

The controller 101 refers to the updating bit map table T4 that is associated with the virtual volume that is the object of reference (S43), and judges whether or not the data of the segment for which read-out was requested is present in the FC volume 320 (S44). In cases where the data requested by the host 10 is stored in the FC volume 320 (S44: YES), the controller 101 specifies the segment number that is the object of reference (S45), and reads out the data from the segment of the FC volume 320 (S47).

On the other hand, in cases where the data requested by the host 10 is not stored in the FC volume 320 as a result of the execution of cleaning processing (described later) (S44: NO), the controller 101 reads out the data requested by the host 10 from the SATA volume (S47).

After the controller 101 stores the data read out from either the FC volume 320 or SATA volume in the cache memory 130, the controller 101 transmits this data to the host 10 (S48). Furthermore, the controller 101 notifies the host 10 that the processing of the read command has been completed (S49).

Thus, in reference processing (read command processing), in cases where the requested data is stored in the FC volume 320, the controller 101 reads out the data from the FC volume 320 and provides this data to the host 10.

Figure 12:
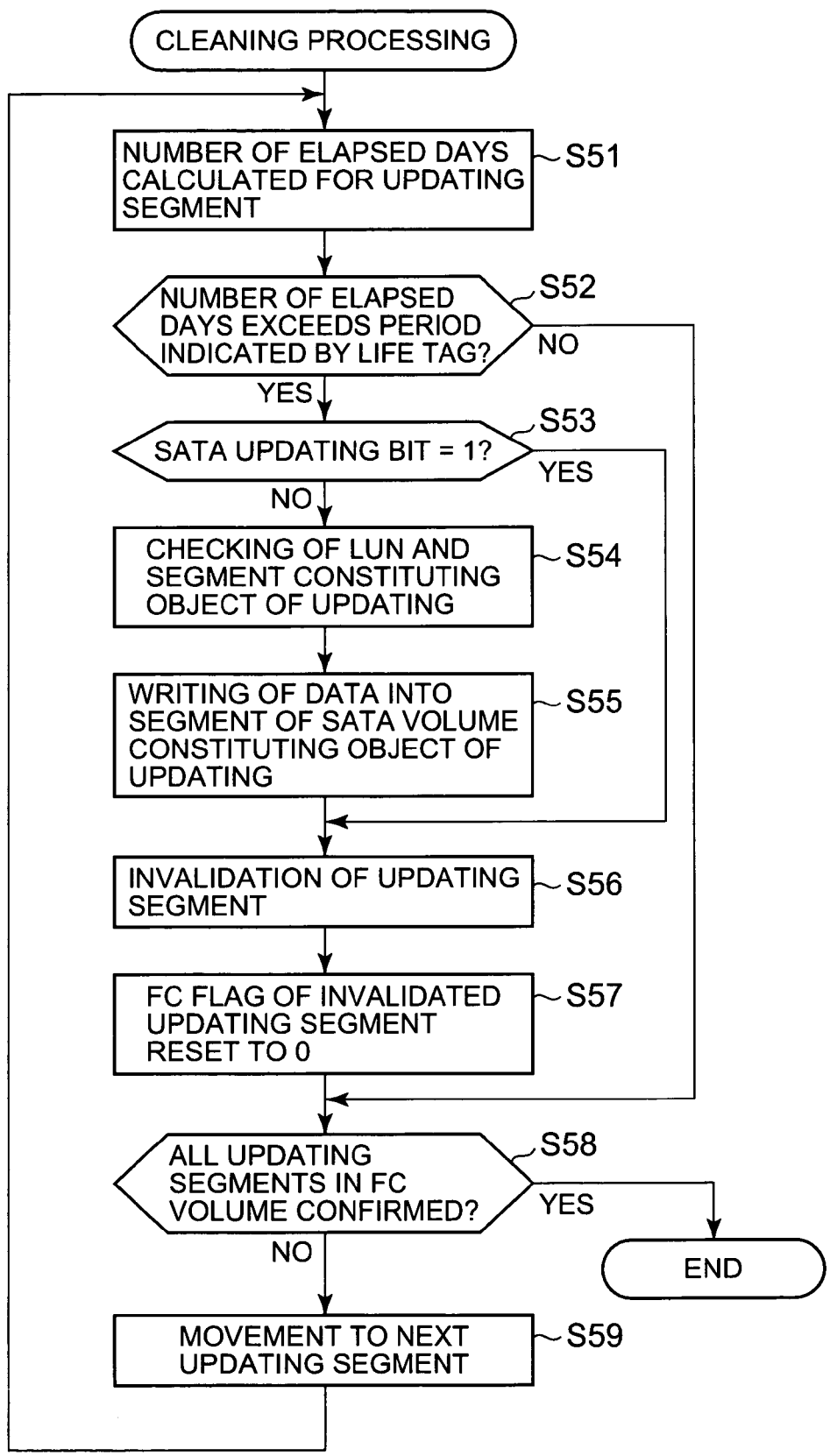
FIG. 12 is a flow chart shown the cleaning processing.

FIG. 12 is a flow chart showing an outline of the cleaning processing. The controller 101 performs cleaning processing at least once a day. In the present embodiment, since the minimum storage period of the life tag is 1 day, it is sufficient if cleaning processing is performed once a day. For example, the controller 101 performs cleaning processing in accordance with the minimum storage period of the life tag.

The controller 101 refers to the updating segment control table T5, and calculates the number of days elapsed up to the current time for each of the respective updating segments stored in the FC volume 320 (S51). The number of days elapsed can be determined by subtracting the updating date of the segment (count value at the time of updating) from the current date (count value of the timer).

The controller 101 compares the number of elapsed days calculated for the segment with the storage period set for the data stored in the segment, and judges whether or not the storage period has elapsed (S52). In cases where the storage period has already elapsed (S52: YES), the controller 101 judges whether or not the SATA updating bit associated with the segment is set as "1" (S53).

In cases where "1" is not set in the SATA updating bit (S53: NO), this indicates a case in which the data that is the object of cleaning is not stored in the SATA volume; accordingly, the controller 101 refers to the LUN and segment of the SATA volume constituting the object of data updating (S54), and writes the data that is the object of erasing into the segment of this confirmed SATA volume (S55). On the other hand, in cases where "1" is set in the SATA updating bit (S53: YES), the data that is the object of erasing is stored in the SATA volume; accordingly, S54 and S55 are skipped.

Next, the controller 101 invalidates the segment storing the data that is the object of erasing in the updating bit map table T4 corresponding to the data that is the object of erasing (S56), and resets the FC flag corresponding to this segment to "0" (S57). As a result, other write data can be overwritten in the segment of the FC volume 320 in which the data that is the object of erasing is stored.

The controller 101 checks whether or not all of the updating segments of the FC volume 320 have been inspected (S58), and in cases where the inspection of all of the updating segments has not been completed (S58: NO), the processing moves to the next segment of the updating segment control table T5 (S59), and returns to S51. Then, when inspection has been completed for all of the updating segments registered in the updating segment control table T5 (S58: YES), this processing is ended.

Since the present embodiment is constructed as described above, this embodiment possesses the following merits. In the present embodiment, a construction is used in which data is respectively written into both a high-speed FC volume 320 and low-speed SATA volumes 330 and 331 during data updating, and data is held in the high-speed FC volume 320 only for a storage period that is set in advance by a life tag.

Accordingly, data with a high utilization frequency can be held in the FC volume 320, so that a rapid response to subsequent data access is possible. Furthermore, after the storage period has elapsed, data is held only in the low-speed, inexpensive SATA volumes 330 and 331, so that the high-speed FC volume 320 is prevented in advance from becoming filled with unnecessary non-urgent data, thus making it possible to maintain high-speed volume response characteristics.

In the present embodiment, since data for which the storage period has elapsed is erased from the high-speed FC volume 320 in the storage device 100, data disposition corresponding to the utilization frequency (utilization value) of the data can be realized without adding any special function to the host 10. Accordingly, the user need not designate the data that is the object of movement or the like as in conventional data migration, so that the convenience of the system is improved. Furthermore, data that is the object of movement does not flow on the communications network CN1 that connects the host 10 and storage device 100, so that an increase in traffic can be prevented.

In the present embodiment, since a construction is used in which respective life tags are set for each virtual volume 310 and 311, life tags can be automatically set for (e. g.) each application using the virtual volumes, or each host using the virtual volumes.

In the present embodiment, virtual volumes 310 and 311 are respectively constructed in a plurality of SATA volumes 330 and 331 in association with a single FC volume 320. Accordingly, a plurality of virtual volumes 310 and 311 can be constructed by means of an FC volume 320 with a small storage capacity compared to the total storage capacity of the respective SATA volumes 330 and 331. As a result, the response characteristics and the like of the storage device 100 can be improved suing an FC volume 320 with a relatively small storage capacity.

In the present embodiment, the levels of the life tags can be set in stages; accordingly, for example, appropriate storage periods can be set in accordance with the type of application programs using the virtual volumes. Furthermore, the setting of life tags and the definition of the contents of these life tags can be set manually by the user via the control terminal 20, so that storage periods can be freely set in accordance with the use configurations of the user.

2. Second Embodiment

A second embodiment will be described with reference to FIGS. 13 through 18. In the present embodiment, life tags are set in the host 10 in file units or directory units. Furthermore, the storage device 100 performs data redisposition (erasing of data from the high-speed volume) in accordance with life tags set by the host 10.

Figure 13:
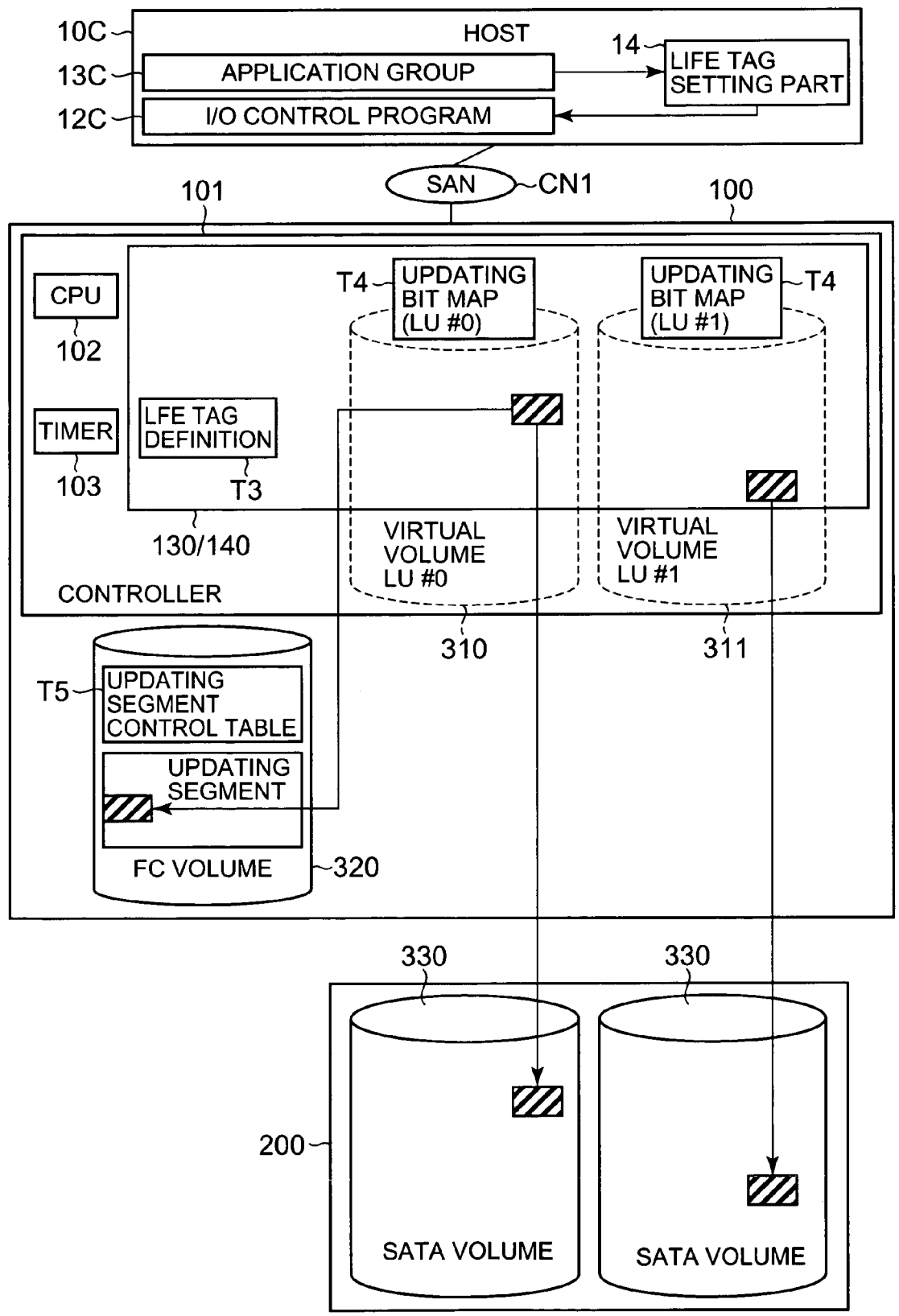
FIG. 13 is a structural explanatory diagram showing the construction of a second embodiment.

As is shown in the overall schematic structural diagram in FIG. 13, the host 10C in the present embodiment (like the hosts 10A and 10B in the abovementioned embodiments) comprises a life tag setting part 14 in addition to an I/O control program 12C, application group 13C and the like.

The life tag setting part 14 has a function that is used to set storage periods in stages in file units or directory units. For example, all or part of this function can be disposed inside the application group 13C. Furthermore, in the present embodiment, since life tags are set in the host 10C, a life tag setting table T2 is not stored in the memory 130/140 of the storage device 100.

Figure 14:
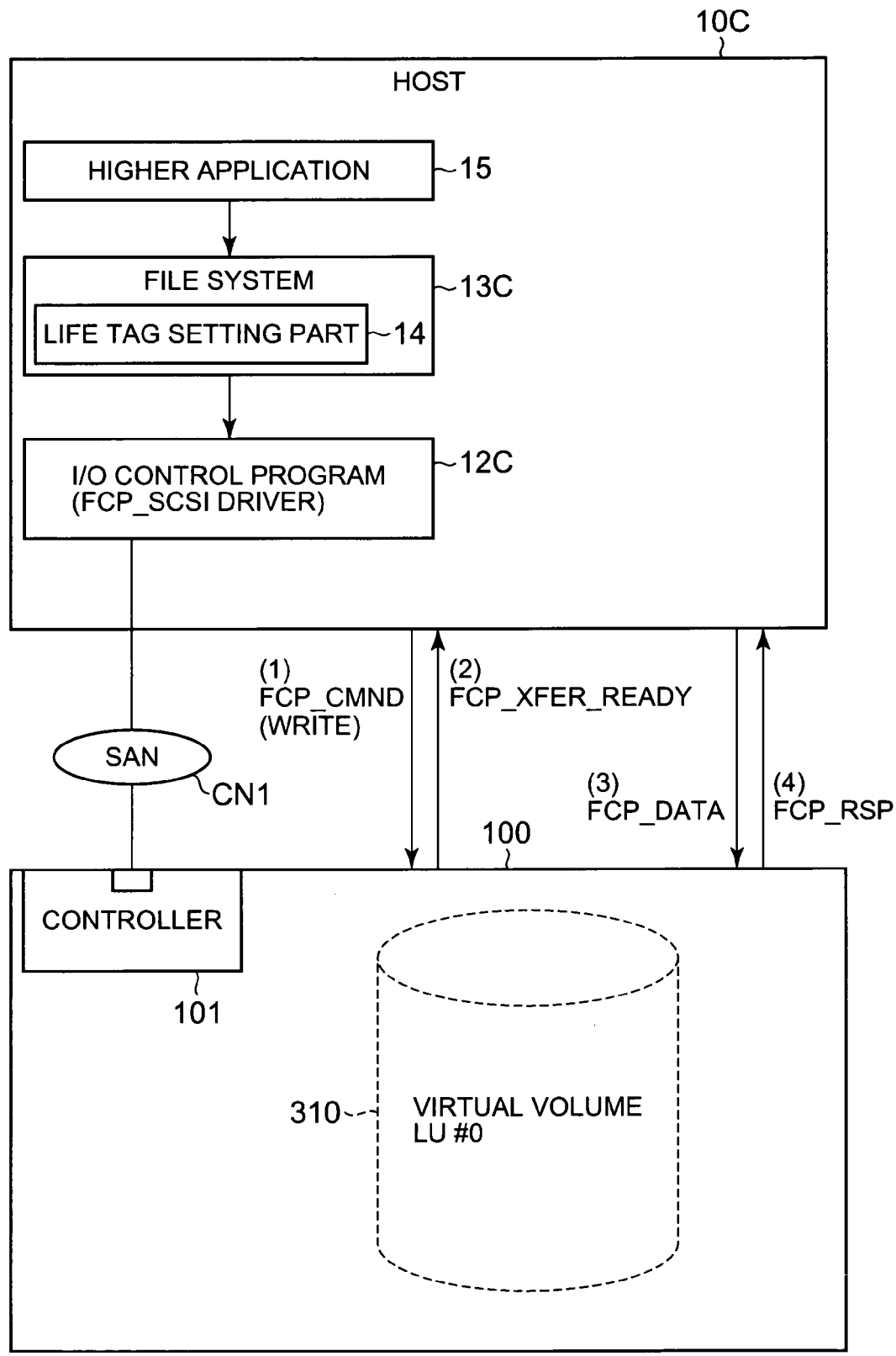
FIG. 14 is a model diagram showing the conditions of information that is exchanged between the host and storage device during write access.

FIG. 14 is a model diagram which shows how communications are performed between the host 10C and storage device 100 during updating processing. As one example, a higher application program (hereafter referred to as a higher application) 15 can be disposed in the host 10. For example, the higher application 15 is document creating software, graphic creating software or the like.

For example, when the higher application 15 requests the updating of a file, the file system 13C which is one example of an application group transfers the file data that is the object of updating to the I/O control program 12C. In the present embodiment, for example, the I/O control program 12C can be constructed as an FCP_SCSI driver program.

The I/O control program 12C issues a write command (FCP_CMND (write)) to the controller 101 of the storage device 100. When the controller 101 receives a write command, the controller 101 checks whether or not any empty capacity is present in the cache memory 130; in cases where such an empty capacity can be confirmed, the controller 101 notifies the host 10C that preparations for the reception of write data have been completed (FCP_XFER_READY).

When the host 10C receives this notification, the host 10C transmits file data to the storage device 100 (FCP_DATA). In cases where the controller 101 normally receives file data and stores this data in the cache memory 130, the controller 101 notifies the host 10C of the completion of processing of the write command (FCP_RSP). In the present embodiment, as will be described later, a life tag is embedded in the write command that is issued by the host 10C.

Figure 15A:
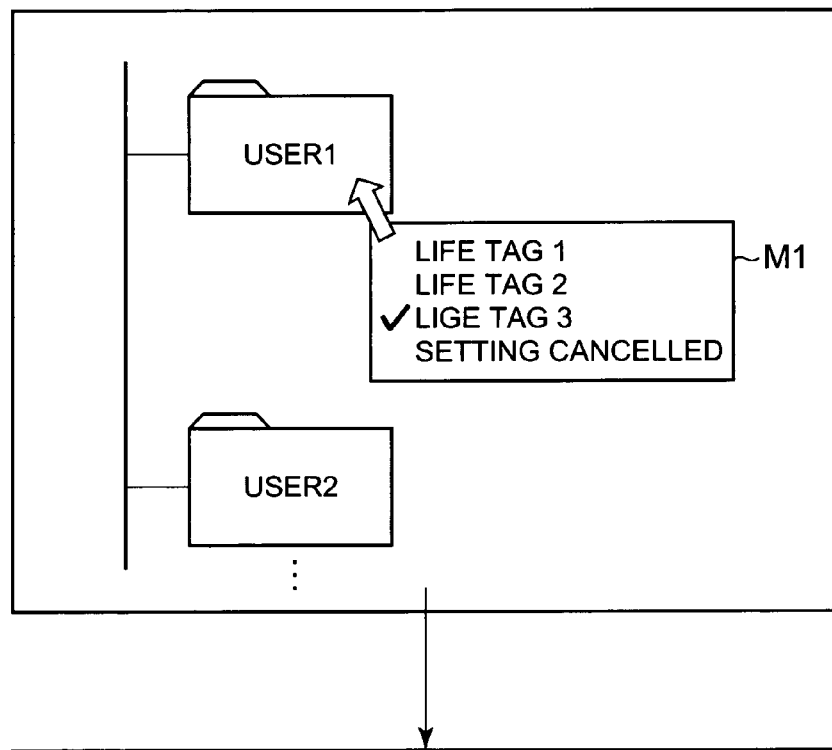
FIG. 15 is an explanatory diagram showing a case in which a life tag is set for each file or directory.

FIG. 15 is a model diagram which shows one example in which the life tags are set in file units or directory units. For example, as is shown in FIG. 15(a), the user displays a file tree structure on the terminal screen, and selects the desired file or directory using a pointing device such as a mouse or the like. The user displays a life tag setting menu M1 for the selected file or directory, and sets a life tag of the desired level.

Figure 15B:
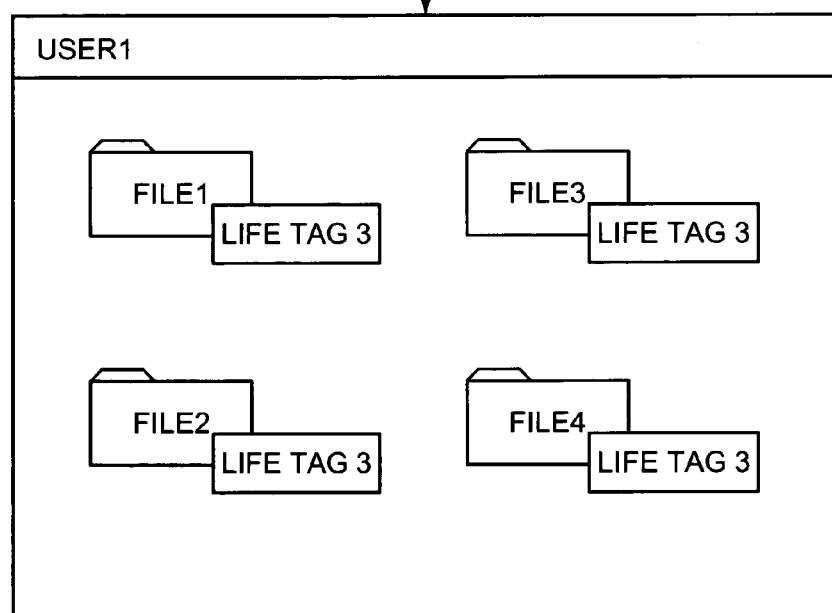

In FIG. 15, it is assumed that the user has selected the directory "User 1", and as set a life tag of level 3. Consequently, as is shown in FIG. 15(b), life tags of level 3 are set for all of the files "file 1" through "file 4" contained in this directory "User 1".

Furthermore, in FIG. 15(b), for convenience of description, the life tag levels are shown as being visualized. However, the present invention is not limited to this; for example, it would also be possible to use a construction in which the levels of the life tags are confirmed by means of a window or the like that displays file attributes. Furthermore, the life tag setting method is not limited to the example described above; various methods can be employed. For example, in cases where files are stored by the higher application 15 or the like, a construction may be used in which desired life tags are set via the user interface of the higher application 15. Furthermore, a construction in which life tags of the same level are uniformly set for all of the files contained in the directory selected by the user is shown as an example. However, the present invention is not limited to this; for example, the system can also be constructed so that the setting of life tags is prohibited for specified files such as system hidden files, files set beforehand by the user or the like.

Figure 16:
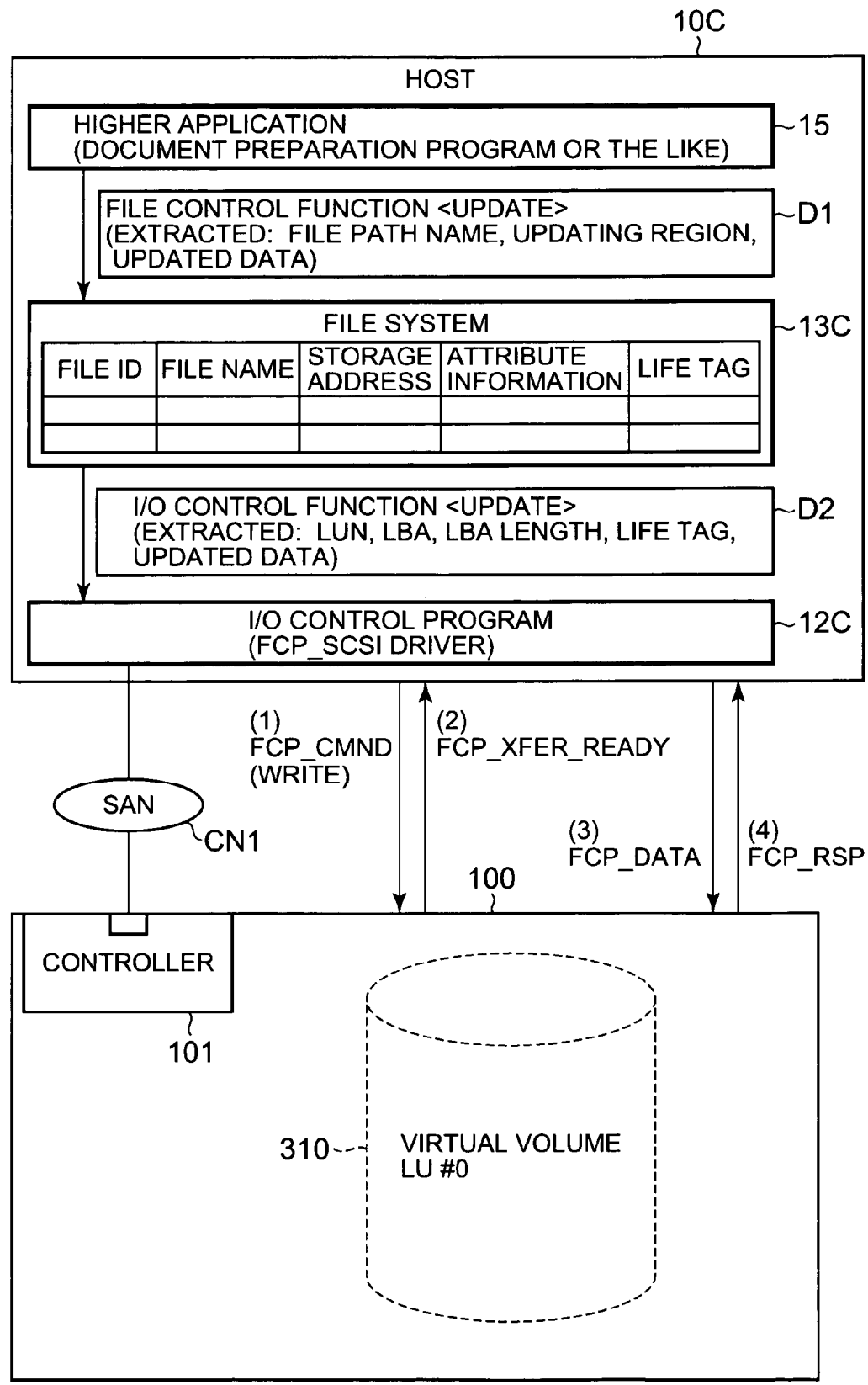
FIG. 16 is an explanatory diagram showing the program construction of the host in a case where a life tag is set by the host.

FIG. 16 is an explanatory diagram which shows how life tags are embedded in the write commands. In cases where the higher application 15 performs file updating, a file control function indicating "updating" is input for the file system 13C from the higher application 15. At this point in time, a life tag is not set for the file that is to be updated.

For example, the file system 13C performs file control by associating file discriminating information, file names, file data storage destination addresses, file attribute information, life tags and the like for each file. When a file control function is input from the higher application 15, the file system associates a life tag with the file data that is to be updated, produces an I/O control function for updating use, and inputs this into the I/O control program 12C.

For example, this I/O control function for updating use may contain the LUN (virtual volume number) in which the file data that is the object of updating is stored, the starting address (LBA: logical block address) of the file data that is to be updated, the LBA length, the level of the life tag and the file data that is to be updated.

Then, when the I/O control program 12C receives the updating I/O control function from the file system 13C, this program produces a specified write command (FCP_CMND (write)), and transmits this command to the storage device 100.

Figure 17:
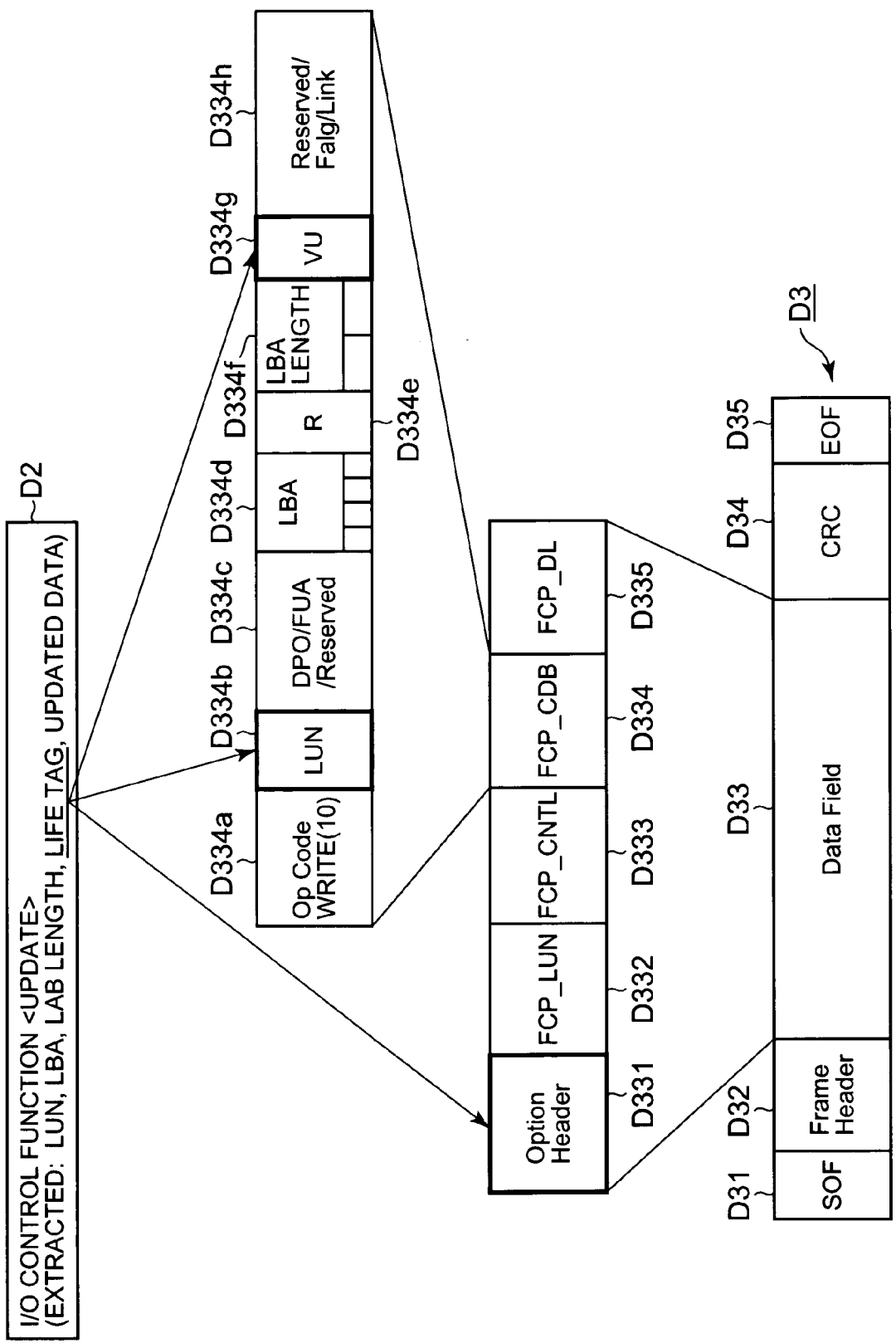
FIG. 17 is an explanatory diagram showing the construction of the write command.

FIG. 17 is an explanatory diagram which shows the construction of the write command. The life tag contained in the I/O control function can be embedded in the write command by various methods. For example, the life tag can be stored in at least one of the regions D331, D334a and D334g described later.

This will be described in order from the lower side of FIG. 17. The frame format D3 used in a fiber channel (FCP) can include the regions D31 through D35. The region D31 is an SOF (start of file) region used to discriminate the head of the frame. The region D32 is a frame header region. The region D33 is a data field region which accommodates commands and the like. The region D34 is a CRC regions which is used to accommodate a CRC (cyclic redundancy check) code that checks the data with the frame header region D32 and data field region D33. The region D35 is an EOF (end of file) region which is used to discriminate the end of the frame.

The data field region D33 can be constructed from the regions D331 through D335. The region D331 is an optional header region, and is provided in cases where the presence of this region is indicated by the frame header region D32. In the optional header region D331, for example, the expiration time of the transmitted frame, the routing between networks and information used to discriminate the process group, process or the like can be accommodated. In ordinary cases, however, this is not used.

The region D332 is an FCP_LUN region that stores the LUN. The region D333 is an FCP_CNTL region that stores control information. The region D334 is an FCP_CDB (command descriptor block) that stores SCSI commands. The region D335 is an FCP_DL region that stores the data length.

The FCP_CDB region D334 can be constructed from the regions D334a through D334h. The region D334a is an operation code region that indicates that this is a write access. The following region D334b is an LUN region that stores the LUN; however, in ordinary cases, this is not used. The region 334c is a DPO (disable page out)/FUA (force unit access) region. The region D334d is an LBA region that stores the logical block address (LBA). The region D334e is a reserved region. The region D334f is an LBA length region. The region D334g is a VU (vendor unique) region which accommodates information unique to the vendor. The region D334h is a region that can accommodate reservation information, flag information and the like.

Here, the regions that can accommodate life tag information will be examined. First, life tag information cannot be stored in regions that are already being used. The life tags must be set in unused regions. Furthermore, in cases where the type (level) of the life tag is tentatively set as "4", an empty region of 2 bits or greater is required in order to accommodate the life tag information. Accordingly, the life tag information can be set in at least one region among the regions D331, D334b and D334g shown in FIG. 17.

Figure 18:
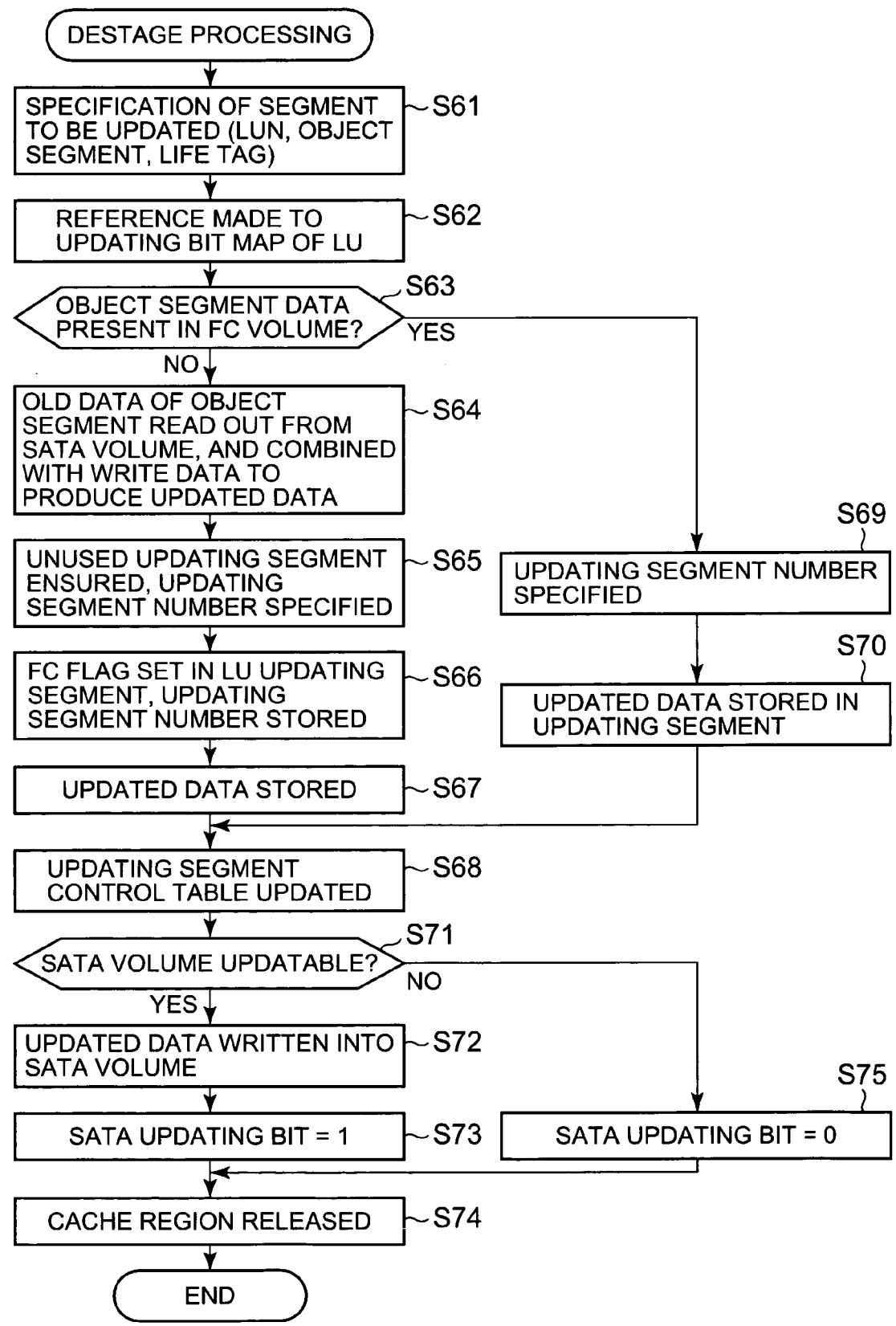
FIG. 18 is a flow chart showing destage processing.

FIG. 18 us a flow chart which shows an outline of the destage processing of the present embodiment. S62 through S75 in the present processing respectively correspond to S22 through S35 in FIG. 10; accordingly, a description of these steps will be omitted.

In S61 of the present processing, this step differs from S21 in FIG. 10 in that life tag information is extracted from the write command. The extracted life tag is stored in a specified position in the updating segment control table T5.

Thus, in the present embodiment, life tags can be set in stages on the side of the host 10C in file units or directory units. Accordingly, even in the case of data that is stored in the same virtual volume, respectively different storage periods can be set. Thus, since life tags can be set in file units or directory units, the disposition of data can be controlled much more in accordance with the utilization frequency, so that the convenience of use is improved.

Furthermore, in the present embodiment, a construction is used in which life tags for updated data can be set on the side of the host, so that the storage device can erase data for which the storage period has elapsed from the high-speed volume in accordance with life tags set by the host. Accordingly, even in the case of detailed data control, there is no burden on the host in regard to searching for object data or moving data. Specifically, in the present embodiment, the host need merely set information (life tags) acting as a policy for data control in file units or directory units; the actual data control based on this data control policy is performed in the storage device. Thus, the setting of data control policies and the execution of control based on these data control policies is divided between the host and the storage device, so that detailed data control can be performed without increasing the burden on the host.

Furthermore, in the present embodiment, life tag information is embedded using an already prepared command structure; accordingly, the convenience of use of the storage device 100 can be improved while maintaining the existing framework.

3. Third Embodiment

Figure 19:
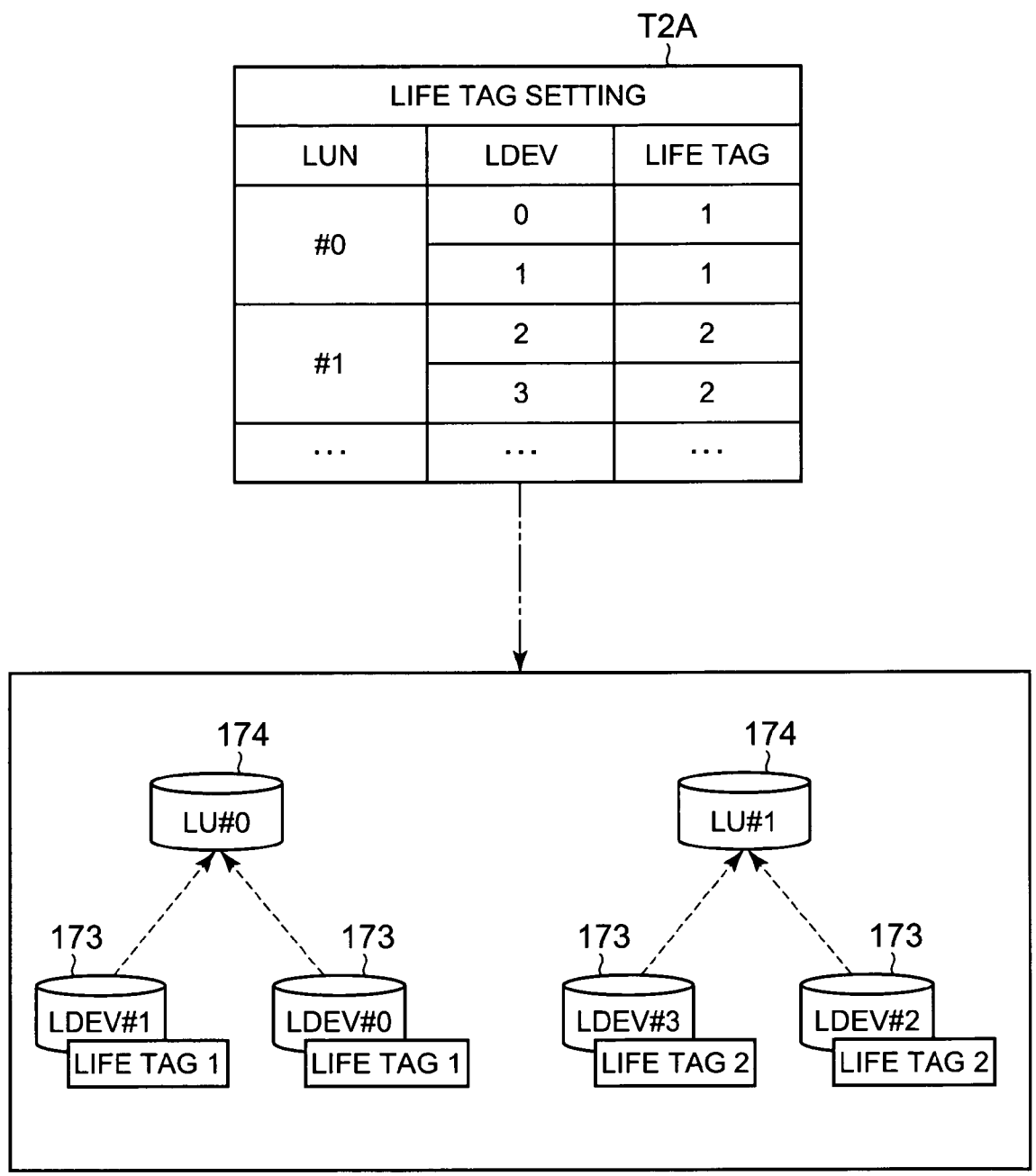
FIG. 19 is an explanatory diagram showing the life tag setting table used in a third embodiment.

A third embodiment will be described with reference to FIG. 19. In the present embodiment, the life tag setting table T2A is expanded, so that life tags can be set even in cases where a plurality of LDEVs are associated with a single LUN.

In the life tag setting table T2A, a plurality of LDEVs and the life tags for the respective LDEVs are associated for each LUN. Thus, the present invention can be applied in cases where a single LUN (virtual volume) is constructed from a plurality of SATA volumes.

4. Fourth Embodiment

Figure 20:
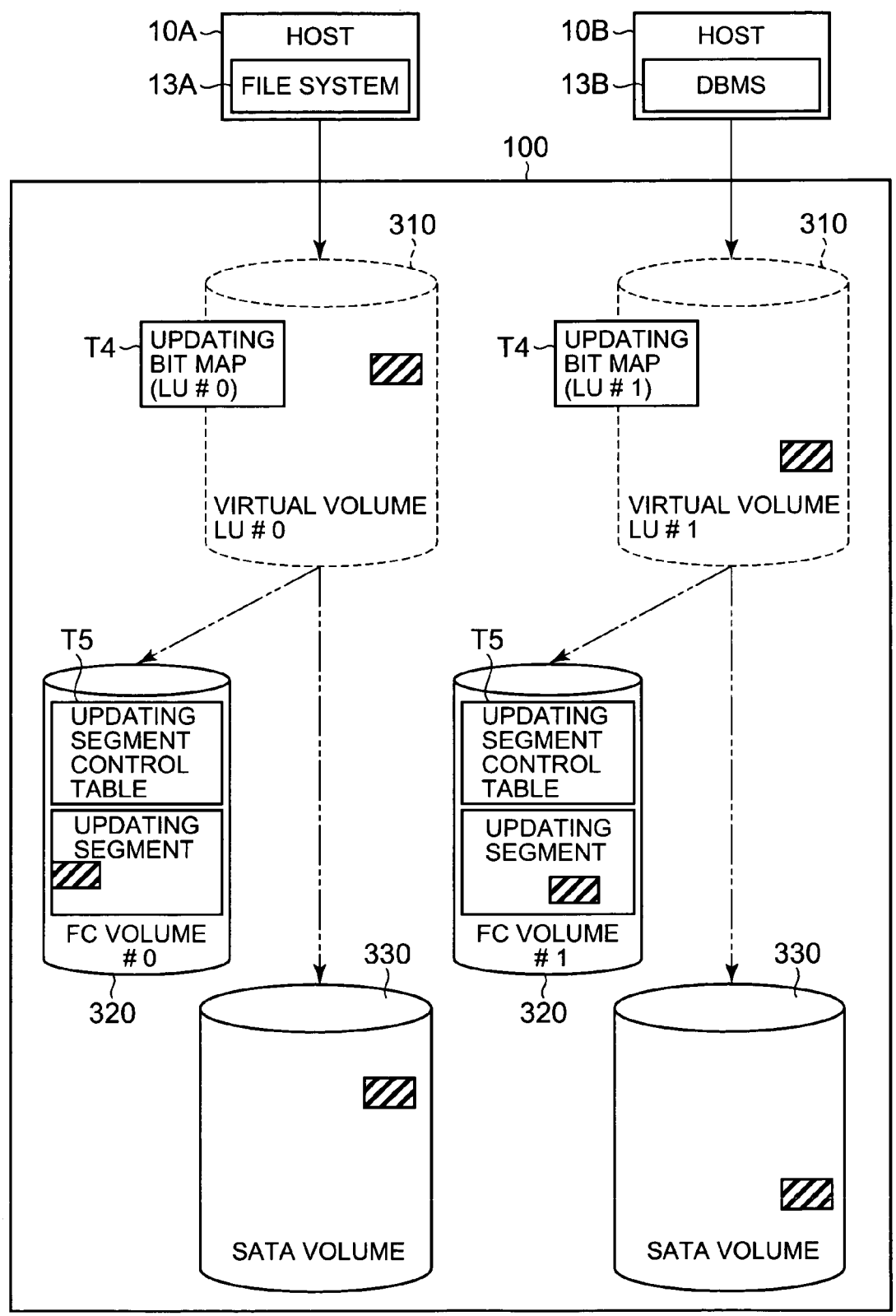
FIG. 20 is an explanatory diagram showing the schematic construction of a fourth embodiment.

A fourth embodiment will be described with reference to FIGS. 20 and 21. As is shown in the schematic structural diagram in FIG. 20, respective FC volumes 320 can be associated with respective virtual volumes 310 in the present embodiment.

Thus, by constructing virtual volume 310 by associating respectively different FC volumes 320 with respective SATA volumes 330, it is possible to increase the proportion of the high-speed storage region in a single virtual volume 310, so that more data can be stored for a longer time in the FC volumes 320 than in the respective embodiments described above.

FIG. 21 shows an example of the construction of the LUN-FC volume correspondence table T7 used in a case where respective FC volumes 320 are associated with respective virtual volumes (LUNs). As is shown in FIG. 21(a), in this table T7, control is performed so that FC volume numbers are associated with respective LUNs. Furthermore, as is shown in FIG. 21(b), a plurality of FC volumes can be installed, and each FC volume can be associated with a plurality of virtual volumes.

5. Fifth Embodiment

Figure 22:
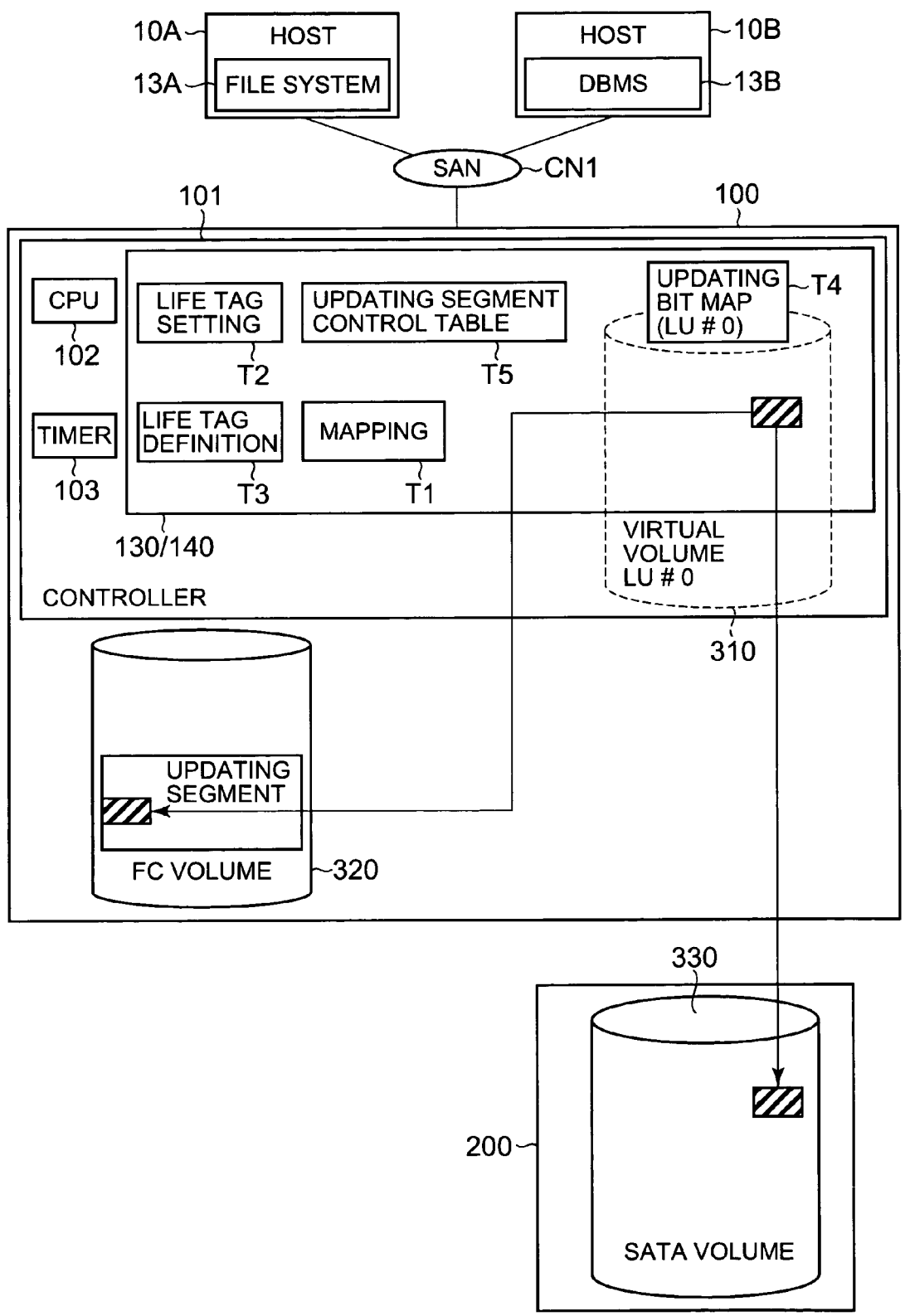
FIG. 22 is an explanatory diagram showing the schematic construction of a fifth embodiment.

A fifth embodiment will be described with reference to FIG. 22. In the present embodiment, the updating segment control table T5 is stored in the memory 130/140 (especially the shared memory 140 for example) rather than being stored in the FC volume 320.

Thus, as a result of the updating segment control table T5 being stored in the memory 130/140, it is possible to store only data in the FC volume 320, so that the storage region of the FC volume 320 can be utilized more effectively.

Furthermore, the present invention is not limited to the embodiments described above. Various additions or alterations may be made by a person skilled in the art within the scope of the present invention. For example, a person skilled in the art can appropriately combine the respective embodiments described above. Furthermore, for example, an NAS (network attached storage) service can be provided by installing a control package mounting an NAS file system (NAS blade) in the storage device. In this case, for example, life tags can be associated with updated files inside the NAS blade.

What is claimed is:

1. A storage device comprising:
a first volume which stores data utilized by a host device, wherein the first volume is contained in at least one Serial Advanced Technology Attachment (SATA) disk drive;
a second volume which stores a dual copy of at least a portion of the data contained in the first volume, and wherein the second volume is contained in at least one fibre channel (FC) disk drive such that the second volume has a quicker access time than the first volume;
wherein the data is written into the first volume and second volume as dual copies responsive to a write command from the host device, where each write command incorporates a life tag specifying a retention term during which the data corresponding to such write command is to be retained in the second volume having the quicker access time than the first volume;
a control part which performs control by extracting the life tag incorporated in the write command, and for corresponding data corresponding to the write command, the control part managing, as update segment control information, a relationship among: a storage position of the corresponding data in the second volume, a storage position of the corresponding data in the first volume, the retention term of the corresponding data as specified by the life tag, and an elapsed term which has elapsed since the corresponding data was stored;
a storage part including a cache memory, where the storage part is configured to temporarily store at least portions of the data in the cache memory, and then to store the at least portions of the data from the cache memory into the first volume and the second volume, wherein the storage part manages the update segment control information, and when the elapsed term of certain data exceeds the retention term of the certain data, the storage part nullifies the certain data in the second volume; and
an access processing part which processes access requests from said host device.

2. The storage device according to claim 1, wherein in cases where the data that is an object of an access request from the host device is stored both in the first volume and in the second volume, the access processing part processes the access request using the second volume.

3. The storage device according to claim 1, wherein a virtual volume that is virtualized including the first volume and the second volume is provided to the host device, where the virtual volume has the same storage capacity as the first volume, and the host device sends the access request to the virtual volume.

4. The storage device according to claim 3, wherein in cases where data is written into the virtual volume from the host device the access processing part writes the data into the first volume in the same storage position as the storage position in the virtual volume, and writes the data into the second volume in a different storage position from the storage position in the virtual volume.

5. The storage device according to claim 1, wherein the retention term is set in specified units by the host device, and the storage part controls the retention term designated by the host device.

6. The storage device according to claim 5, wherein the host device can set the retention term in either file units or directory units, or in both file units and directory units.

7. The storage device according to claim 1, wherein the retention term can be set in stages.

8. The storage device according to claim 1, wherein the retention term can be set beforehand in LU (logical unit) units.

9. The storage device according to claim 1, wherein the retention term can be set in logical volume units that are associated with LUs (logical units).

10. The storage device according to claim 1, wherein storage part confirms that the data that is the object of nullifying is stored in the first volume, and in cases where the data that is the object of nullifying is not stored in the first volume, the data erasing part stores this data that is the object of nullifying in the first volume, and then nullifies this data that is the object of nullifying from the second volume.

11. The storage device according to claim 1, wherein the cache memory temporarily stores the data that is written in from the host device, wherein the access processing part stores the data from the host device in the second volume in cases where a specified empty capacity does not exist in the cache memory.

12. The storage device according to claim 1, wherein the data stored in the second volume is stored in the first volume at a specified timing.

13. The storage device according to claim 1, wherein either the first volume or the second volume, or both of the volumes, are associated with an external volume of another storage device disposed on the outside, and write data for the first volume or the second volume is stored in the external volume.

14. The storage device according to claim 1, wherein a plurality of the first volumes are provided, and the second volume is respectively associated with the plurality of first volumes.

15. The storage device according to claim 1, wherein a plurality of the first volumes are provided, and the second volume is respectively associated with each of these first volumes.

16. A method for controlling the life cycle of data stored in a storage device, comprising:
  storing data utilized by a host device in a first volume, wherein the first volume is contained in at east one Serial Advanced Technology Attachment (SATA) disk drive;
  storing a dual copy of at least a portion of the data contained in the first volume, in a second volume, and wherein the second volume is contained in at least one fibre channel FC) disk drive such that the second volume has a quicker access time than the first volume;
  wherein the data is written into the first volume and second volume as dual copies responsive to a write command from the host device, where each write command incorporates a life tag specifying a retention term during which the data corresponding to such write command is to be retained in the second volume having the quicker access time than the first volume;
  performing control by extracting the life tag incorporated in the write command, and then for corresponding data corresponding to the write command, managing, as update segment control information, a relationship among: a storage position of the corresponding data in the second volume, a storage position of the corresponding data in the first volume, the retention term of the corresponding data as specified by the life tag, and an elapsed term which has elapsed since the corresponding data was stored;
  temporarily storing at least portions of the data in a cache memory, and then storing the at least portions of the data from the cache memory into the first volume and the second volume, and managing the update segment control information such that when the elapsed term of certain data exceeds the retention term of the certain data, nullifying the certain data in the second volume; and
  processing access requests from said host device using an access processing part.

17. A storage system comprising a host device and a storage device which is connected to this host device, wherein the host device can designate a data retention term in file units or directory units, or in both types of units, where the storage device comprises:
  a first volume which stores data utilized by a host device, wherein the first volume is contained in at least one Serial Advanced Technology Attachment (SATA) disk drive;
  a second volume which stores a dual copy of at least a portion of the data contained in the first volume, and wherein the second volume is contained in at least one fibre channel (FC) disk drive such that the second volume has a quicker access time than the first volume;
  wherein the data is written into the first volume and second volume as dual copies responsive to a write command from the host device, where each write command incorporates a life tag specifying the retention term during which the data corresponding to such write command is to be retained in the second volume having the quicker access time than the first volume;
  a control part which performs control by extracting the life tag incorporated in the write command, and for corresponding data corresponding to the write command, the control part managing, as update segment control information, a relationship among: a storage position of the corresponding data in the second volume, a storage position of the corresponding data in the first volume, the retention term of the corresponding data as specified by the life tag, and an elapsed term which has elapsed since the corresponding data was stored;
  a storage part including a cache memory, where the storage part is configured to temporarily store at least portions of the data in the cache memory, and then to store the at least portions of the data from the cache memory into the first volume and the second volume, wherein the storage part manages the update segment control information, and when the elapsed term of certain data exceeds the retention term of the certain data, the storage part nullifies the certain data in the second volume; and
  an access processing part which processes access requests from said host device.

* * * * *